(12) United States Patent
Yeh et al.

(10) Patent No.: US 10,088,331 B1
(45) Date of Patent: Oct. 2, 2018

(54) ROUTE-BASED OPTIMIZATION OF OBJECT DISPLAYS ON USER INTERFACES

(71) Applicant: GOOGLE LLC, Mountain View, CA (US)

(72) Inventors: Shih-Hao Yeh, Santa Clara, CA (US); Navid Samadani-McQuirk, San Bruno, CA (US); Jack Cameron Dillé, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/878,672

(22) Filed: Jan. 24, 2018

Related U.S. Application Data

(60) Provisional application No. 62/607,892, filed on Dec. 19, 2017.

(51) Int. Cl.
*G01C 21/34* (2006.01)
*G01C 21/36* (2006.01)
*G06Q 30/06* (2012.01)

(52) U.S. Cl.
CPC ....... *G01C 21/3679* (2013.01); *G01C 21/343* (2013.01); *G01C 21/3484* (2013.01); *G01C 21/3676* (2013.01); *G06Q 30/0633* (2013.01); *G06Q 30/0639* (2013.01); *G06Q 30/0641* (2013.01)

(58) Field of Classification Search
CPC .............. G01C 21/3679; G01C 21/343; G01C 21/3676; G01C 21/3484; G06Q 30/0639; G06Q 30/0633; G06Q 30/0641
See application file for complete search history.

(56) References Cited

U.S. PATENT DOCUMENTS

| | | | |
|---|---|---|---|
| 8,886,460 B1 * | 11/2014 | Keoshkerian | H04W 4/20 701/454 |
| 9,830,589 B2 * | 11/2017 | Xing | G06Q 20/3278 |
| 2003/0158796 A1 * | 8/2003 | Balent | G06Q 10/087 705/28 |

\* cited by examiner

*Primary Examiner* — Richard M Camby
(74) *Attorney, Agent, or Firm* — Johnson, Marcou & Isaacs, LLC

(57) ABSTRACT

A computing device receives a request to render an optimized display of selected objects on a user interface. The computing device analyzes a layout associated with the selected objects by determining a category of each of the selected objects, a location of each category within the location, and an optimized route between each category. The computing device analyzes routes to the locations by determining least optimal times associated with each location, a time to arrive and complete the optimized route at each location, and an order to the locations to optimize arrival time at a time other than the least optimal times. The computing device renders an optimized display of the selected objects on the user interface with an optimized route to each location and an optimized display of the selected objects in an order corresponding the optimized routes between each category within the location layouts.

20 Claims, 14 Drawing Sheets

ROUTE-BASED OPTIMIZATION OF OBJECT DISPLAYS ON USER INTERFACES

CROSS-REFERENCE TO RELATED APPLICATION

This patent application claims priority to U.S. Patent Application No. 62/607,892, filed Dec. 19, 2017, and entitled "Route-Based Optimization Of Object Displays On User Interfaces." The entire contents of the above-identified application are hereby fully incorporated herein by reference.

TECHNICAL FIELD

The technology disclosed herein relates to optimizing presentation of objects on a user interface.

BACKGROUND

Users often create lists that comprise generalized terms and item descriptions. The user is then required to transform these lists of generalized terms into corresponding objects. However, multiple objects can correspond to each generalized term. Conventional systems require the user to perform online searches for each generalized term to return multiple objects without reference to the user's preference or intent when entering the generalized term.

Additionally, after the user selects the appropriate objects, the selected object are typically presented in order of selection or in an order that corresponds to the listing of generalized terms. Without considering the locations associated with each selected object, the user is presented with a random, non-optimized listing of the selected objects.

SUMMARY

Techniques herein provide computer-implemented methods to optimize object display on a user interface. In an example, one or more computing devices receives notifications of selection of user interface elements on a user computing device requesting selection of objects and a notification of selection of a user interface element requesting an optimized display of the selected objects. The one or more computing devices analyzes a layout of a first location associated with two or more of the selected objects by determining a layout of the first location, determining a category of each of the at least two selected objects, determining a location of each category within the first location, and determining an optimized route between each category within the layout of the first location. The one or more computing device analyzes routes to the locations associated with the selected objects by determining least optimal times associated with each location, a time to arrive and complete the optimized route at each location, and determining an order to the locations to optimize arrival time at a time other than the least optimal times. The one or more computing devices renders an optimized display of the selected objects on the user interface of the user computing device with an optimized route to each location and an optimized display of the selected objects in an order corresponding the the optimized routes between each category within the location layouts.

In certain other example aspects described herein, systems and computer program products to optimize object display on a user interface are provided.

These and other aspects, objects, features, and advantages of the example embodiments will become apparent to those having ordinary skill in the art upon consideration of the following detailed description of illustrated examples embodiments.

DETAILED DESCRIPTION OF THE EXAMPLE EMBODIMENTS

Overview

Figure 1:
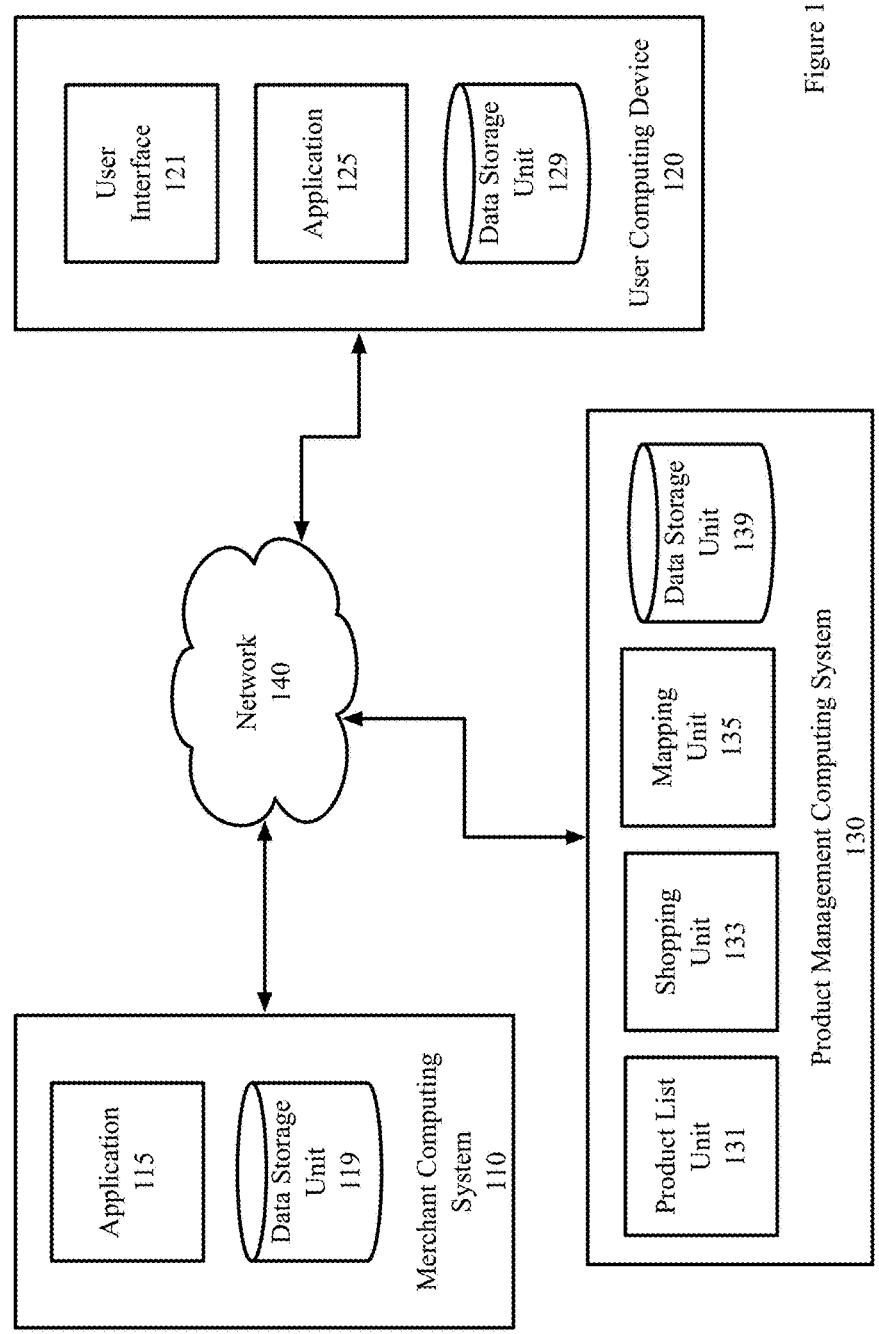
FIG. 1 is a block diagram depicting a system to optimize object presentation, in accordance with certain examples.

Embodiments herein provide computer-implemented techniques optimize presentation of objects displayed on a user interface. In an example, a user accesses a list of items on a user computing device. An example list of items comprises a listing of two or more items that correspond to products the user desires to purchase, for example, a shopping list. In an example, the user presses a user interface element to find products available for purchase that correspond to the items entered on the shopping list. In response to receiving the request to shop the list of items, a product management computing system identifies products that correspond to each item on the list, determines where each identified product is available for purchase, and determines a purchase price of the product. The product management computing system also determines whether the user has preferences or defined rules regarding which products/merchants are preferred by the user. In an example, the product management computing system determines an optimized presentation of each product that corresponds to each item on the user's list based on the user's preferences. In an example, the optimized listing of available products is displayed on the user interface of the user computing device. An example optimized listing comprises two or more products shown with at least one of the two or more products shown in a highlighted display position. In this example, showing the product in the highlighted display position directs the user's attention to the product. In an example, the determination of the optimized listing is performed in real time or near real time so that once the user presses the user interface element to shop the list, the optimized display is returned to the user computing device.

In an example, the user presses a user interface element to select two or more available products that correspond to the items entered on the shopping list. After selecting the desired available products, the user presses a user interface element to display the selected products on the user interface. In an example, the selected products are displayed in an order that corresponds to the order in which the products were selected. In another example, the selected products are displayed in an order that corresponds to the order of the items on the shopping list.

In an example, the user presses a user interface element to optimize the display of the selected products. In an example, the optimized display of the selected products comprises an optimized travel route. An example optimized travel route comprises an optimized list of selected products. In an example, an optimized list of selected products comprises a listing of the selected products organized by selected merchant. In another example, the optimized list of selected products comprises a listing of the selected products from each selected merchant organized to optimize the travel route within the selected merchant's store location to obtain each of the selected products. In an example, the optimized travel route comprises the route requiring the least amount of expected travel time. In an example, the optimized list comprises placing the selected products in an order that corresponds to the optimized route of travel within the store location. In an example, the product management computing system determines a store layout for each merchant and maps a product category associated with each selected product to the store layout. In another example, the product management computing system deduces the store layout from an order in which prior user checked off selected products from their shopping lists, a store layout for a related merchant location, or from the categories of products selected from the merchant. In an example, the product management computing system determines the expected travel time to each product category display location to each of the other product category display locations, the store entrance, and the point of sale terminals within the store location. In this example, the product management computing system uses the determined distances and an expected rate of travel to determine an expected travel time. Using the expected travel times within the store location, the product management computing system can determine the optimized travel route within the store location to obtain each of the selected products. In this example, the selected products are placed in an order on the shopping list that corresponds to the optimized route of travel within the store location.

In another example, the optimized travel route comprises a listing of destination points to obtain all the selected items prioritized to take the least amount of combined shopping and travel time. In another example, the optimized travel route comprises a listing of destination points to obtain all the selected items prioritized by a type or category of items that is optimally purchased last before the user returns home. In another example, the optimized travel route comprises a listing of directions to proceed from the user's origination point to each selected merchant and then to the user's end point, organized according to prioritized travel and user preferences. In an example, the product management computing system determines the expected travel time from the current or expected location of the user to the store location for each selected merchant. In an example, the product management computing system calculates the expected travel time at the departure time to each location using the designated travel mode. In this example, the product management computing system can recalculate a distance between the origination location and each merchant location. Based on the calculated distances, the product management computing system can determine the expected travel time between each location. In an example, the product management computing system can adjust the travel times based on expected traffic. In another example, the product management computing system can further adjust the travel times based on how busy each merchant is expected to be.

By using and relying on the methods and systems described herein, the system to optimize object presentation provides improvements and enhancements over conventional systems, for instance by improving the way the data is processed to address a complex combinatorial problem. The product management computing system processes multiple streams of data, user parameters, multiple merchant inventories, multiple product possibilities, multiple route possibilities, multiple merchant store layouts, and multiple user preferences to determine the optimized presentation of items. In order to adequately search, identify, and present valid products and valid routes for presentation from such a complex data set, efficient computer methods for analyzing the data set are needed. The system improves computer functionality by improving the way the data is processed to address the complex combinatorial problem and to improving computer functionality by reducing the complexity of the data set such that it can be analyzed using more computationally efficient bitwise operations.

Various examples will be explained in more detail in the following description, read in conjunction with the figures illustrating the program flow.

Turning now to the drawings, in which like numerals represent like (but not necessarily identical) elements throughout the figures, example embodiments are described in detail.

Example System Architectures

FIG. 1 is a block diagram depicting a system to optimize object presentation, in accordance with certain examples. As depicted in FIG. 1, the example operating environment 100 comprises systems 110, 120, and 130 that are configured to communicate with one another via one or more networks 140 via network computing devices. In another example, two or more of these systems (including systems 110, 120, and 130) are integrated into the same system. In some examples, a user associated with a device must install an application and/or make a feature selection to obtain the benefits of the techniques described herein.

Each network 140 comprises a wired or wireless telecommunication mechanism by which network systems (including systems 120 and 130) can communicate and exchange data. For example, each network 140 can include, be implemented as, or may be a part of, a storage area network (SAN), personal area network (PAN), a metropolitan area network (MAN), a local area network (LAN), a wide area network (WAN), a wireless local area network (WLAN), a virtual private network (VPN), an intranet, an Internet, a mobile telephone network, a card network, Bluetooth, Bluetooth Low Energy (BLE), near field communication network (NFC), any form of standardized radio frequency, infrared, sound (for example, audible sounds, melodies, and ultrasound), other short range communication channel, or any combination thereof, or any other appropriate architecture or system that facilitates the communication of signals, data, and/or messages (generally referred to as data). Throughout this specification, it should be understood that the terms "data" and "information" are used interchangeably herein to refer to text, images, audio, video, or any other form of information that can exist in a computer-based environment.

In an example, each network system (including systems 110, 120, and 130) comprises a device having a communication module capable of transmitting and receiving data over the network 140. For example, each network system (including systems 110, 120, and 130) may comprise a server, personal computer, mobile device (for example, notebook computer, handheld computer, tablet computer, netbook computer, personal digital assistant (PDA), video game device, GPS locator device, cellular telephone, Smartphone, or other mobile device), a television with one or more processors embedded therein and/or coupled thereto, an appliance with one or more processors embedded therein and/or coupled thereto, or other appropriate technology that comprises or is coupled to a web browser or other application for communicating via the network 140. In the example depicted in FIG. 1, the network systems (including systems 110, 120, and 130) are operated by merchants, users, and product management computing system operators, respectively.

The merchant computing system 110 comprises an application 115 and a data storage unit 119. In an example, the merchant operates a brick and mortar commercial store and maintains an inventory of items within the physical store that may be purchased by the user within the store location. In another example, the merchant operates an online store and maintains an inventory of items that may be purchased by the user and shipped to the user's address. In another example, the merchant operates both a brick and mortar commercial store and an online store, offering the user the option to travel to the store or have items delivered.

In an example, the merchant maintains an inventory of items available for purchase and a purchase price associated with each item. The application 115 is a program, function, routine, applet or similar entity that exists on and performs its operations on the merchant computing system 110. For example, the application 115 may be one or more of a shopping application, merchant computing system 110 application, an Internet browser, or other suitable application operating on the merchant computing system 110 that allows the merchant to maintain an inventory of items and communicate with the product management computing system 130. In some examples, the merchant must install an application 115 and/or make a feature selection on a merchant computing device to obtain the benefits of the techniques described herein.

In an example, the data storage unit 119 may be a memory unit resident on the merchant computing system 110. An example data storage unit 110 enables storage of item inventory and item prices for retrieval by or communication to the product management computing system 130. In an example, the data storage unit 119 can include any local or remote data storage structure accessible to the merchant computing system 110 suitable for storing information. In an example, the data storage unit 119 stores encrypted information, such as HTML5 local storage.

In an example, a user can view an optimized display of selected objects on a user computing device 120. An example user computing device 120 comprises a user interface 121, an application 125, and a data storage unit 129. In an example, the user computing device 120 may be a personal computer, mobile device (for example, notebook, computer, tablet computer, netbook computer, personal digital assistant (PDA), video game device, GPS locator device, cellular telephone, Smartphone or other mobile device), television, wearable computing devices (for example, watches, rings, or glasses), or other appropriate technology that comprises or is coupled to a web server (or other suitable application for interacting with web page files) or that comprises or is coupled to an application 125.

The user can use the user computing device 120 to create a list of desired items, view an optimized display of the objects corresponding to the list of desired items, select one or more desired objects, and view an optimized display of the selected objects via the user interface 121 and the application 125. For example, the user interface 121 comprises a touch screen, a voice-based interface, or any other interface that allows the user to provide input and receive output from the application 125. In an example, the user interacts with the application 125 via the user interface 121.

The application 125 is a program, function, routine, applet or similar entity that exists on and performs its operations on the user computing device 120. For example, the application 125 may be one or more of a shopping application, an Internet browser, a user interface 121 application, or other suitable application operating on the user computing device 120. In some examples, the user must install an application 125 and/or make a feature selection on the user computing device 120 to obtain the benefits of the techniques described herein.

In an example, the data storage unit 129 enables storage of user contact details for retrieval of a product management computing system 130 account. In an example, the data storage unit 129 can include any local or remote data storage structure accessible to the user computing device 120 suitable for storing information. In an example, the data storage unit 129 stores encrypted information, such as HTML5 local storage.

Figure 8:
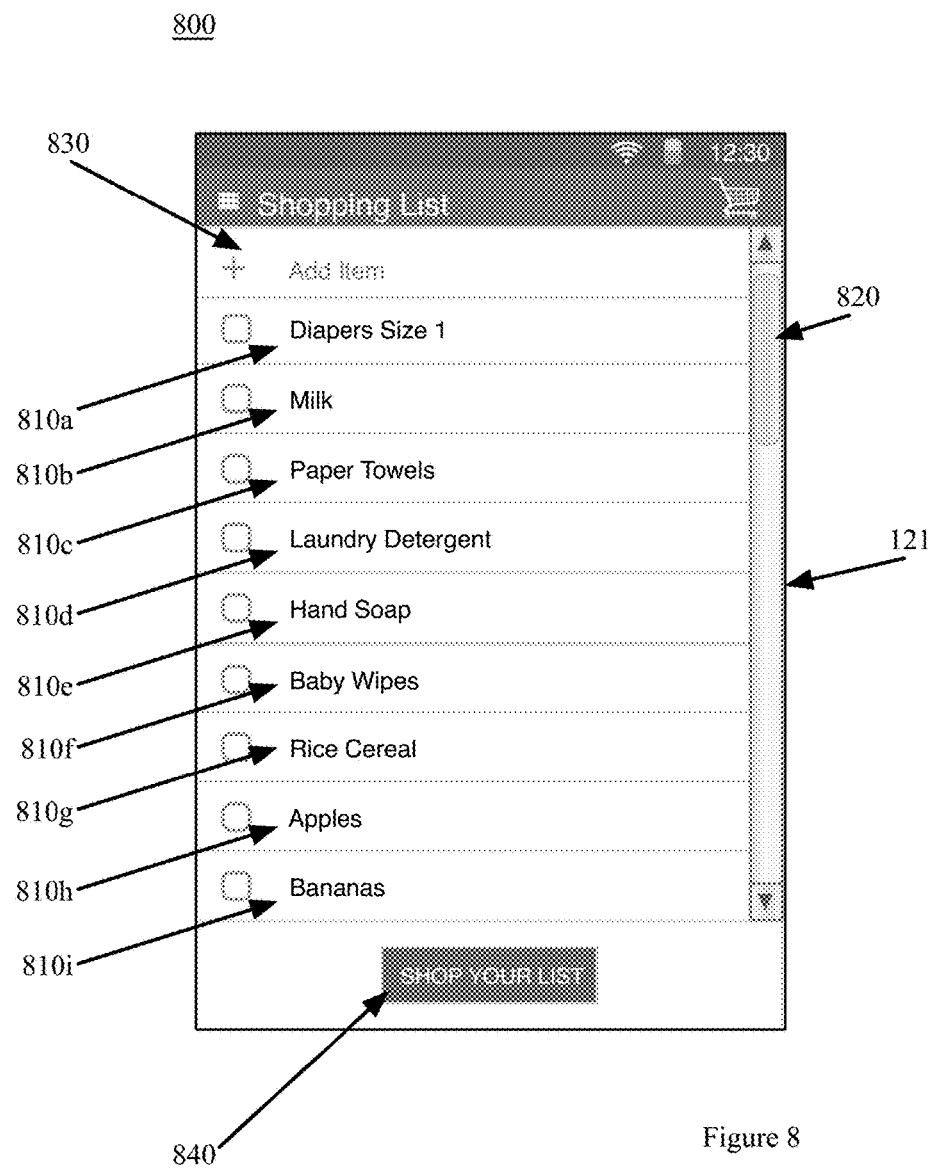
FIG. 8 is a block diagram depicting a shopping list display on a user interface, in accordance with certain examples.

In an example, the user communicates with the product management computing system 130 using the application 125 and the user interface 121. An example product management computing system 130 comprises a product list unit 131, a shopping unit 133, a mapping unit 135, and a data storage unit 139. An example product list unit 131 communicates with the user computing device 120 to create a listing of desired items, add items to an existing list, delete items from a list, and otherwise manipulate the list and/or items on the list. In an example the user manipulates user interface elements displayed on the user interface 121 of the user computing device 120 to manipulate the list and/or items on the list. In an example, the listing of items comprises a shopping list and each item comprises a product. An example shopping list is shown in FIG. 8.

Figure 9:
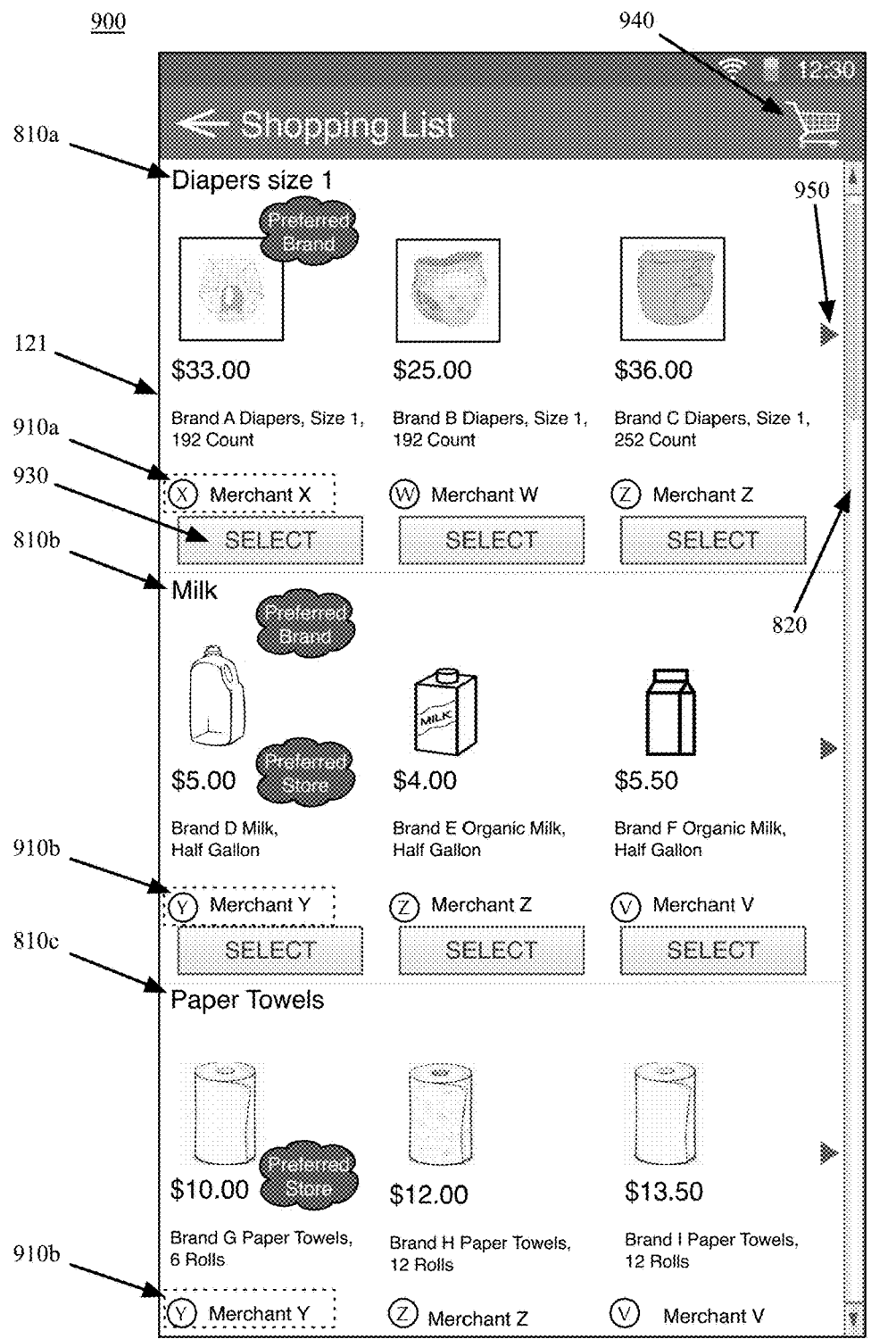
FIG. 9 is a block diagram depicting an optimized display of available products on a user interface, in accordance with certain examples.

In an example, the user manipulates a user interface element displayed on the user interface 121 of the user computing device 120 to instruct the product management computing system 130 to present an optimized display of products available for purchase that correspond to the items displayed on the shopping list. An example shopping unit 133 communicates with the one or more merchant computing systems 110 to determine availability and pricing associated with each item on the user's shopping list. An example shopping unit 133 retrieves user preferences, shopping history, and related user information to present an optimized display listing on the user interface 121 of the user computing device 120. In an example, the optimized display listing comprises a listing of one or more products corresponding to the user's shopping list. An example optimized display of available products is shown in FIG. 9.

Figure 10:
FIG. 10 is a block diagram depicting a display of selected items on a user interface, in accordance with certain examples.

In an example, the user manipulates user interface elements displayed on the user interface 121 of the user computing device 120 to select two or more products from the display of available products. An example display of selected products is shown in FIG. 10.

Figure 12:
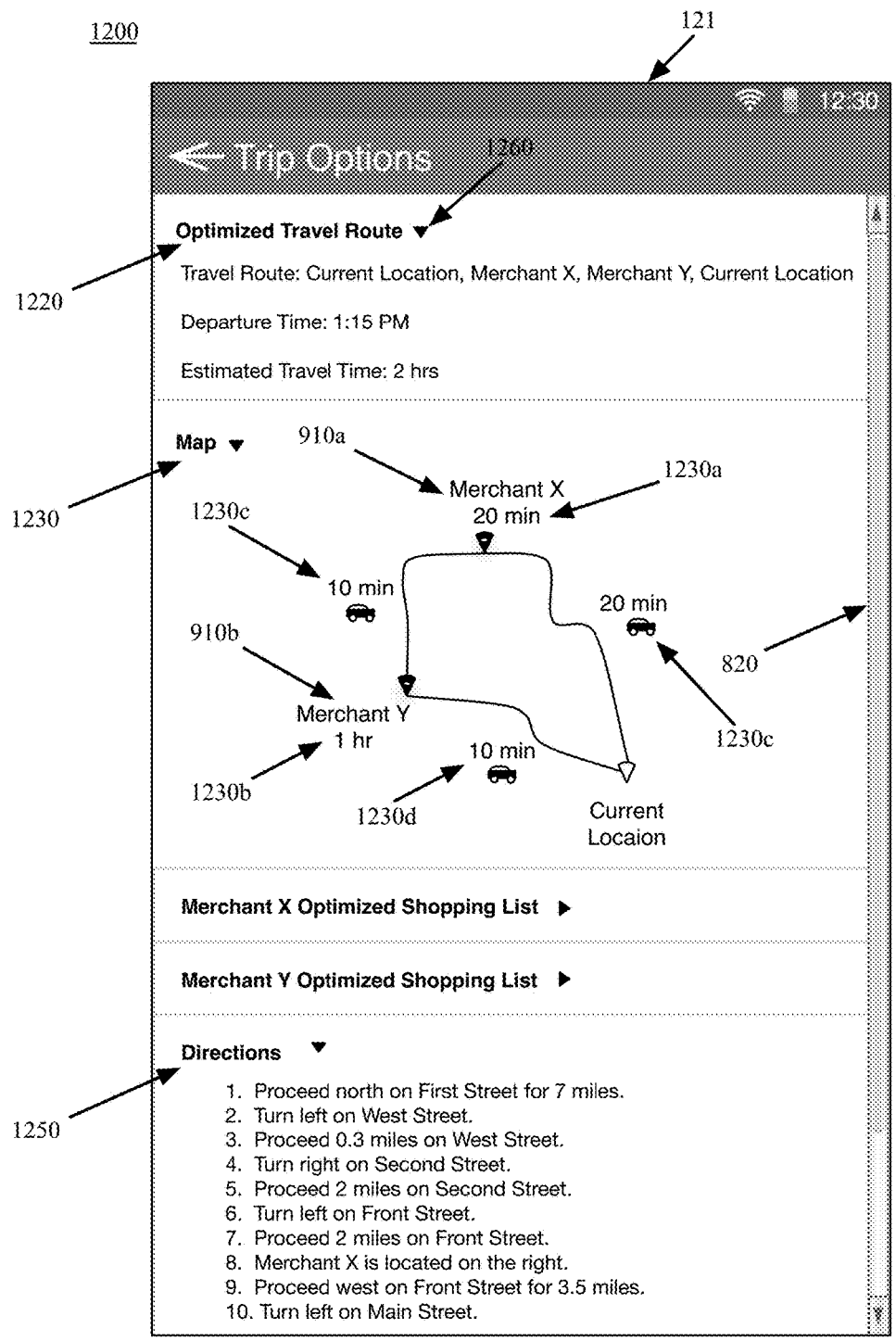
FIG. 12 is a block diagram depicting an optimized display of travel routes on a user interface, in accordance with certain examples.

In an example, the user manipulates a user interface element displayed on the user interface 121 of the user computing device 120 to instruct the product management computing system 130 to present an optimized display of selected products. In another example, the user manipulates a user interface element displayed on the user interface 121 of the user computing device 120 to manipulate and/or define trip preferences. Example trip preferences comprise an origination and end route location, a departure time, a mode of transportation, the maximum distance the user is willing to travel from the origination location, and other trip preferences. In another example, the user previously defined one or more trip preferences and the product management computing system 130 retrieves the saved trip preferences. In this example, the retrieved trip preferences are displayed on the user interface 121 and applied to determine the optimized route. An example mapping unit 135 retrieves the trip preferences and the selected products. In an example, the mapping unit 135 determines the merchant locations that correspond to the selected products and determines the optimized route of travel between the origination location, the merchant locations, and the end route location. An example display of the optimized travel routes is shown in FIG. 12.

Figure 11:
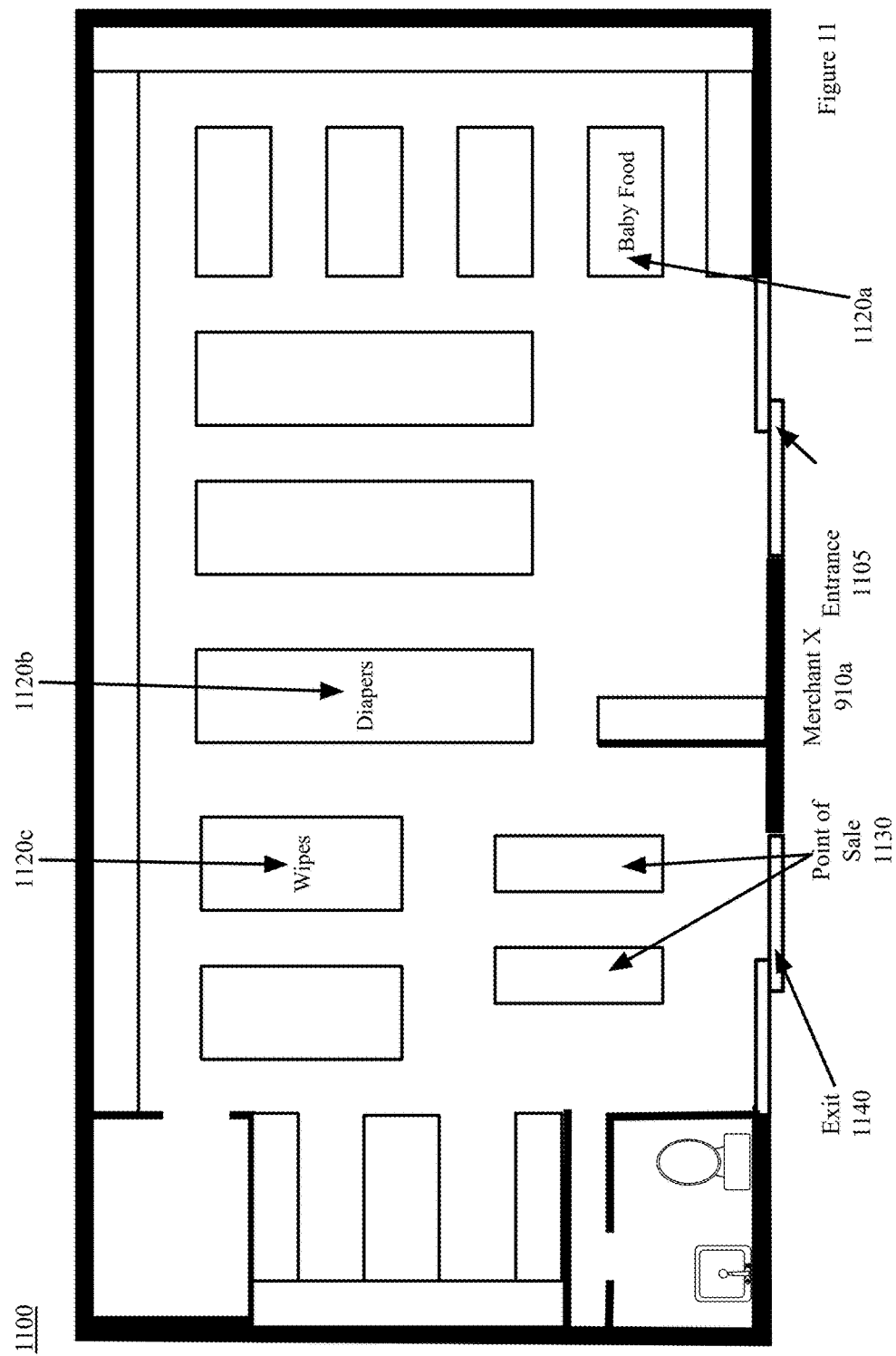
FIG. 11 is a block diagram depicting a store layout, in accordance with certain examples.

An example mapping unit 135 also determines each merchant location store layout. In an example, the mapping unit 135 deduces the store layout from an order in which previous users obtained items on their shopping lists (for example, the order in which items were marked off their shopping lists). An example display of a store layout is shown in FIG. 11.

Figure 13:
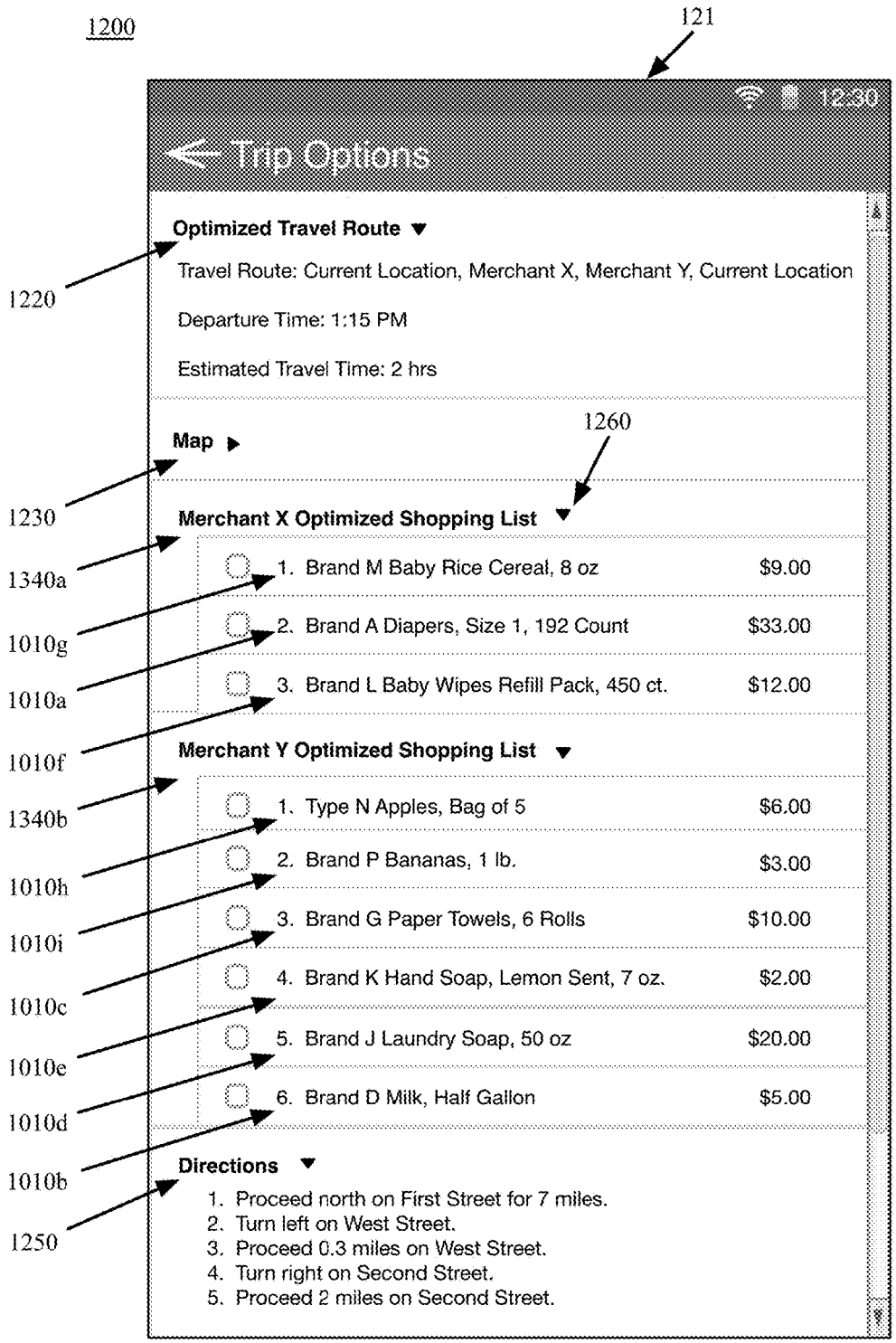
FIG. 13 is a block diagram depicting an optimized display of selected items on a user interface, in accordance with certain examples.

In another example, the mapping unit 135 determines an optimized route of travel for the user to take within the store to retrieve the selected products by determining a product category for each selected product and comparing the product categories to the determined store layout. An example display of the optimized selected products is shown in FIG. 13.

The shopping lists, user preferences, shopping history, store templates, selected products, trip preferences, and related information are saved in the data storage unit 139. In an example, the data storage unit 139 can include any local or remote data storage structure accessible to the product management computing system 130 suitable for storing information. In an example, the data storage unit 139 stores encrypted information, such as HTML5 local storage.

It will be appreciated that the network connections shown are example and other means of establishing a communications link between the computers and devices can be used. Additionally, those having ordinary skill in the art and having the benefit of the present disclosure will appreciate that the computing devices illustrated in FIG. 1 can have any of several other suitable computer system configurations. For example a user computing device 120 embodied as a mobile phone or handheld computer may not include all the components described above.

Figure 14:
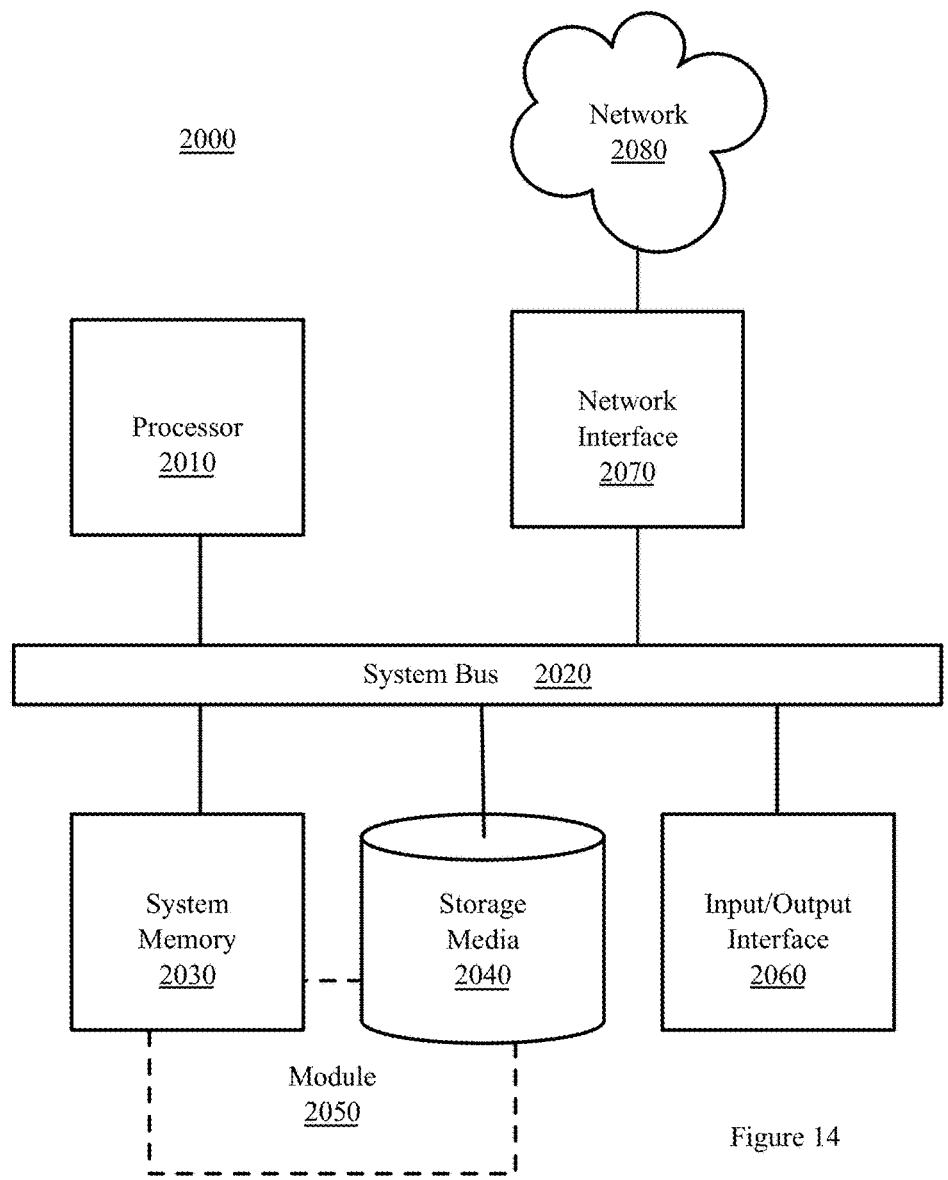
FIG. 14 is a block diagram depicting a computing machine and a module, in accordance with certain examples.

In examples, the network computing devices and any other computing machines associated with the technology presented herein may be any type of computing machine such as, but not limited to, those discussed in more detail with respect to FIG. 14. Furthermore, any functions, applications, or components associated with any of these computing machines, such as those described herein or any others (for example, scripts, web content, software, firmware, hardware, or modules) associated with the technology presented herein may by any of the components discussed in more detail with respect to FIG. 14. The computing machines discussed herein may communicate with one another, as well as with other computing machines or communication systems over one or more networks, such as network 140 and 2080. The network 140 and 2080 may comprise any type of data or communications network, including any of the network technology discussed with respect to FIG. 14.

Example Processes

The components of the example operating environment 100 are described hereinafter with reference to the example methods illustrated in FIGS. 2-7. The example methods of FIGS. 2-7 may also be performed with other systems and in other environments. The operations described with respect to any of the FIGS. 2-7 can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

Figure 2:
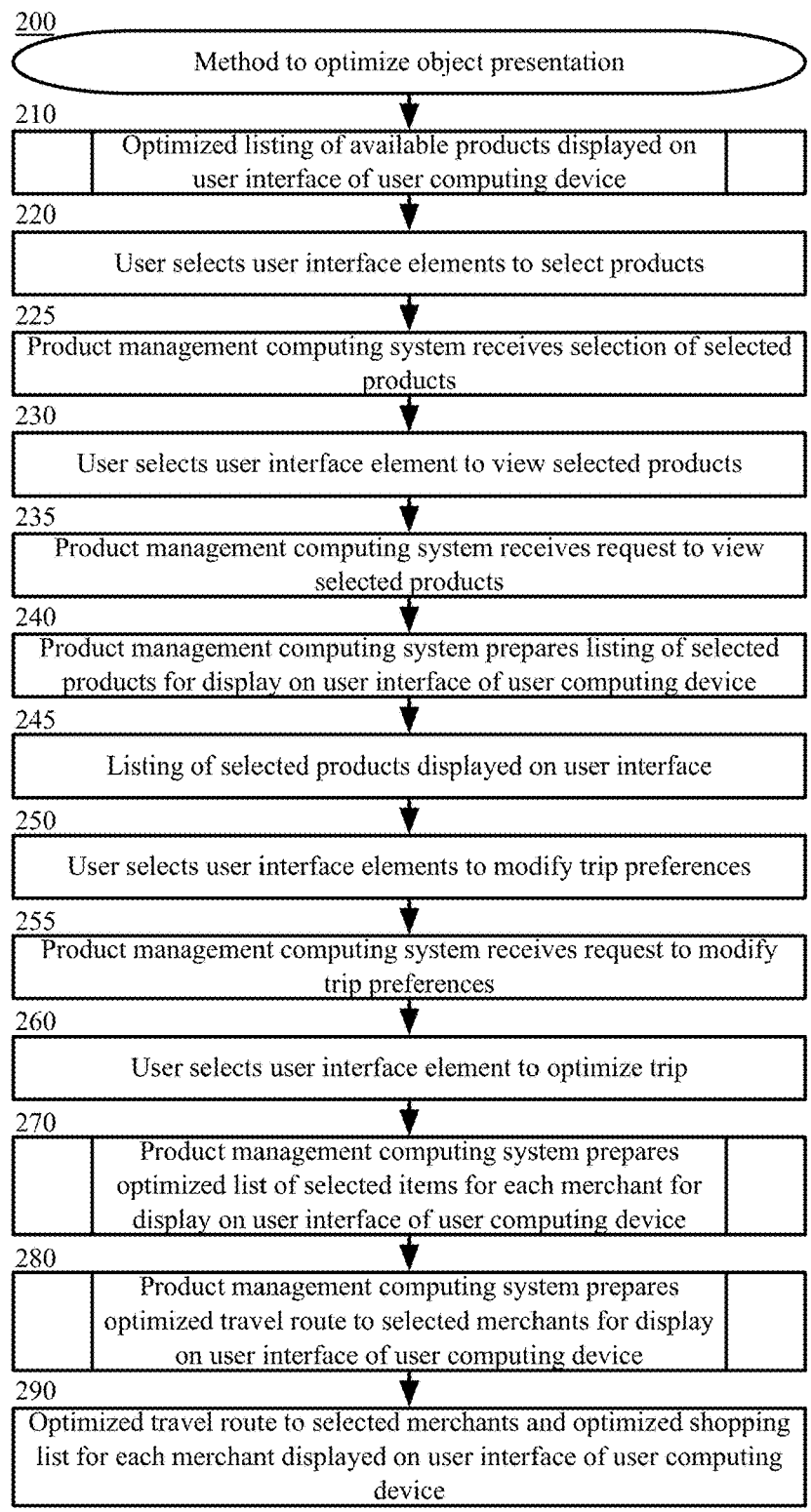
FIG. 2 is a block flow diagram depicting a method to optimize object presentation, in accordance with certain examples.

FIG. 2 is a block flow diagram depicting a method to optimize object presentation, in accordance with certain examples. The method 200 is described with reference to the components illustrated in FIG. 1.

In block 210, an optimized listing of available products is displayed on the user interface 121 of the user computing device. The method to display an optimized listing of available products on the user interface 121 of the user computing device 120 is described in more detail hereinafter with reference to the methods described in FIG. 3. In an example, the optimized listing comprises two or more products shown with at least one of the two or more products shown in a highlighted display position. In this example, showing the product in the highlighted display position directs the user's attention to the product. An example highlighted position comprises a position on the left-most edge of the listing of products with additional products corresponding to the item on the user's shopping list displayed to the right of the highlighted product. In other examples, the highlighted product is positioned in the center of the user interface or in a position that comprises stylized text, an icon, or badge indicating that the product and/or merchant is preferred. In an example, the product management computing system 130 determines an optimized presentation of each product that corresponds to each item on the user's shopping list based on the user's preferences, past purchases, viewing behaviors, and/or selected rules. In an example, the determination of the optimized listing is performed in real time or near real time so that once the user presses the user interface element to shop the list, the optimized display is returned to the user computing device.

Figure 3:
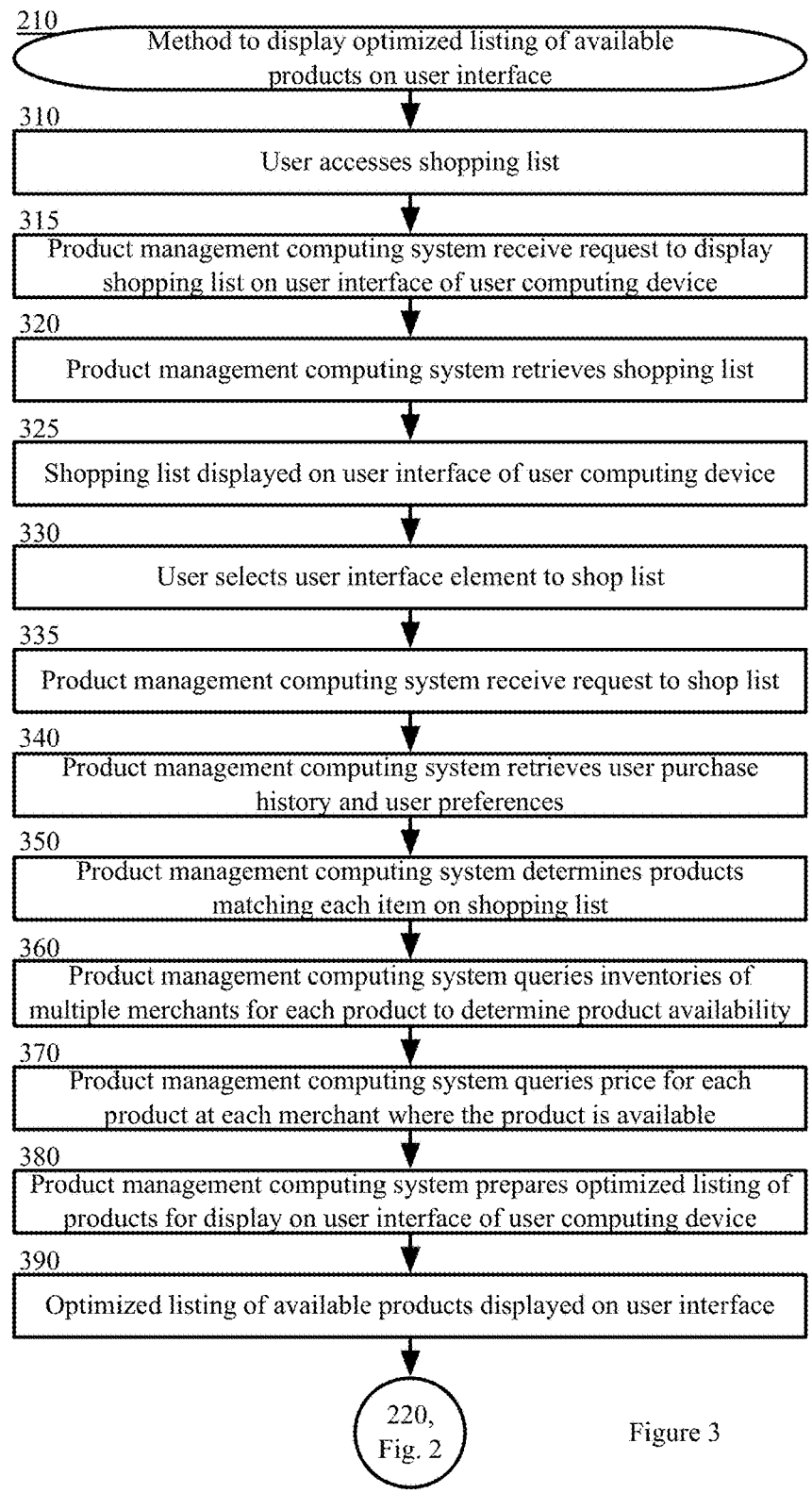
FIG. 3 is a block flow diagram depicting a method to display optimized listing of available products on a user interface, in accordance with certain examples.

FIG. 3 is a block flow diagram depicting a method 210 to display an optimized listing of available products on the user interface 121 of the user computing device 120, in accordance with certain examples, as referenced in block 210. The method 210 is described with reference to the components illustrated in FIG. 1.

In block 310, the user accesses a shopping list. In an example, the user opens or accesses an application 125 on the user computing device 120. The application 125 comprises a shopping list application 125 or web browser application 125 that enables the user computing device 120 to display the shopping list. In an example, the user has previously created and added items to the shopping list. In this example, the shopping list comprises a listing of one or more items or products that the user desires to purchase.

In an example the shopping list and/or application 125 comprises a user identifier or account identifier that enables the product management computing system 130 to identify the user or the user computing device 120. In another example, the user can create more than one shopping list. In this example, the user selects the desired shopping list using the application. For example, the user interface 121 displays an identifier or user interface element representing each of the one or more shopping lists and the user selects the desired shopping list by pressing or activating the user interface 121 element. In an example, each shopping list comprises an identifier that enables the product management computing system 130 to identify the particular shopping list.

In block 315, the product management computing system 130 receives the request to display the shopping list on the user interface 121 of the user computing device 120. In an example, the application 125 transmits a request to the product management computing system 130 that comprises one or more identifiers that enable the product management computing system 130 to identify the requested shopping list. In an example, the one or more identifiers comprise the user account identifier and/or the shopping list identifier.

In block 320, the product management computing system 130 retrieves the requested shopping list. In an example, the product management computing system 130 determines which shopping list corresponds to the one or more identifiers included in the request and retrieves the corresponding shopping list from the data storage unit 139.

In block 325, the shopping list is displayed on the user interface 121 of the user computing device 120. In an example, the product management computing system 130 transmits the retrieved shopping list to the application 125 for display on the user interface 121. In an example, the shopping list comprises a listing of one or more terms entered by or on behalf of the user. An example listing of terms comprises generalized terms describing one or more items desired by the user. In an example, the generalized terms comprise an item description or broad category that corresponds to a shopping list item. For example, the generalized term is "milk" instead of the specific terms "Brand A Organic Skim Milk." In other examples, the listing of terms comprises specific terms entered by or on behalf of the user. In this example, the user enters or the product management computing system 130 determines the specific terms corresponding to the user's desired item.

In an example, the displayed shopping list comprises a listing of one or more products and a user interface 121 element that allows the user to add additional items to the shopping list. In another example, the displayed shopping list comprises a user interface 121 element that allows the user to instruct the application 125 to search for available products that correspond to the items on the shopping list.

FIG. 8 illustrates an example shopping list 800 displayed on a user interface 121 of a user computing device 120. In this example, the shopping list 800 comprises the following nine items: size 1 diapers 810a, milk 810b, paper towels 810c, laundry detergent 8410d, hand soap 810e, baby wipes 810f, rice cereal 810g, applies 810h, and bananas 810i. In an example, the nine items 810a through 810i are displayed in a vertical list with a single item on each line of the shopping list 800.

In another example, each item (810a through 810i) comprises a user interface 121 element on the left-most edge of each line on the list. For example, the user interface 121 element comprises a checkbox or button that is selectable by the user. In an example, the user can select the user interface 121 element to cross-off or indicate that an item was purchased. In another example, the user can swipe across the listed item to delete or cross-off the item.

In an example, the user can add additional items to the shopping list 800 by selecting the "Add Item" user interface element 830. In an example, when the "Add Item" user interface element 830 is selected, the user interface 121 displays a keyboard that allows the user to type in a desired item. In another example, the user can speak into a microphone component of the user computing device 120 to add an additional item. In an example, the user interface 121 displays the additional item in the listing of items 810.

In an example, the user can select a "Shop Your List" user interface element 840 to instruct the product management computing system 130 to search for available products that correspond to each item 810a through 810i listed in the shopping list 800.

In another example, the vertical listing of extends beyond the visible user interface 121 screen. In this example, a scroll bar element 820 is presented to allow the user to view different portions of the user interface 121 display.

Returning to FIG. 3, in block 330, the user selects a user interface 121 element that instructs the product management computing system 130 to search for available products that correspond to each item listed in the shopping list. Continuing with the previous example, the user selects the "Shop Your List" user interface element 840 by pressing or hovering over the displayed user interface 121 element.

In block 335, the product management computing system 130 receives the request to shop the user's shopping list. In an example, the application 125 receives the user's selection of the user interface 121 element and communicates a request to the product management computing system 130. In this example, the request comprises an identifier for each product on the shopping list. In another example, the request further comprises an account identifier that corresponds to the user and/or the shopping list. In this example, the account identifier enables the product management computing system 130 to identify the user's account.

An example user's account comprises user preferences and/or shopping history. In an example, the product management computing system 130 maintains a history of prior purchases and/or selections made by the user. In this example, the product management computing system 130 can analyze the user's history to determine user preferences. For example, the user has previously purchased Brand AA chips on multiple occasions. The product management computing system 130 can determine that the user has a preference for Brand AA chips based on the multiple prior purchases.

In another example, the user defines or selects preferences. For example, the user can select options that instruct the product management computing system 130 that the user prefers the cheapest product choices, or that the user prefers to order/shop at the fewest number of merchant locations. In another example, the user can select options that instruct the product management computing system 130 that the user prefers Merchant CC, Brand BB products, whole milk, and/or organic products. In another example, the product management computing system 130 can analyze user actions and/or receive notices of user actions/preferences from another computing system to deduce user preferences. In an example, the user preferences and user purchase history are stored in the data storage unit 139 for retrieval and analysis by the product management computing system 130. In an example, the user preferences are continuously updated.

In block 340, the product management computing system 130 retrieves the user's purchase history and/or user preferences. In an example, the product management computing system 130 identifies the user account using the account identifier that corresponds to the user and/or the shopping list from the request to shop the user's shopping list.

In block 350, the product management computing system 130 determines which products correspond to each item listed on the shopping list. In an example, the product management computing system 130 identifies each product using the product identifiers from the request to shop the user's shopping list. In this example, the product management computing system 130 cross-references each product identifier with known products to identify the corresponding products.

In an example, an item listed on the shopping list is specific enough to enable the product management computing system 130 to identify a known product. Continuing with the previous example in FIG. 8, "Diapers size 1" 810a from the shopping list 800 will return a result of size 1 infant diapers of various brands. In another example, an item on the shopping list may return more than one type of specific product. Continuing with the previous example, "Milk" 810b from the shopping list 800 can return various different types of milk (for example, whole milk, condensed milk, powdered milk, chocolate milk), various different sizes (for example, half gallon, one can, one pint), and various different brands (for example, Brand A, Brand B, Brand C). In an example, the product management computing system 130 creates a predictive model or trains a classifier model to predict a known product that corresponds to the item listed on the shopping list based on prior product suggestions, the user's purchase history, and/or user preferences. In an example, the predictive model is an artificial neural network or other form of adaptive system model, wherein the system analyzes data and relationships to find patterns in data. In another example, the classifier model is a Gaussian Mixture Model, decision tree, Markov Decision Process, or other mathematical framework for modeling decision making. In an example, the model is trained based on historical data to predict a user's purchase intent based on previous products selected after entry of an item on a shopping list and user preference data received by the product management computing system 130. In an example, the process is an ongoing learning process, wherein data is continuously added to the product management computing system 130 and the model is continuously updated.

In block 360, the product management computing system 130 queries inventories of multiple merchant computing systems 110 for each product to determine product availability. In an example, the product management computing system 130 transmits a request to each merchant computing system 110 to determine whether each product is available at the merchant. In another example, the merchant computing systems 110 routinely communicate inventory to the product management computing system 130. In yet another example, the product management computing system 130 queries an online system or central database to determine where each product is available.

In block 370, the product management computing system 130 queries the price of each product at each of the merchants where the product is available. In an example, the product management computing system 130 transmits a request to each merchant computing system 110 to determine a price of each corresponding product available at the merchant. In another example, the merchant computing systems 110 routinely communicate prices to the product management computing system 130. In yet another example, the product management computing system 130 queries an online system or central database to determine pricing of each product.

In block 380 the product management computing system 130 prepares an optimized listing of products for display on the user interface 121 of the user computing device 120. In an example, the product management computing system 130 is determining an optimized order to present the product(s) identified in block 350 as corresponding to the item on the user's shopping list based first on the user's preferences for or against particular brands, merchants, and products. In an example, the product management computing system 130 determines whether the user has a preference for or a history of purchases for a product matching an item on the shopping list. In an example, the product management computing system 130 cross references the product(s) identified in block 350 as corresponding to the item on the user's shopping list to the user's purchase history and/or user preferences identified in block 340 to identify prefered products. In another example, the product management computing system 130 maps an identified product to known product purchases and user preferences to predict the user's intent when entering the item on the shopping list. For example, the product management computing system 130 can predict that the user intended to purchase Brand BB chips based on the user's known preference for Brand BB chips, even if the user only entered "chips" on the shopping list.

In yet another example, the product management computing system 130 creates a predictive model or trains a classifier model to predict a preferred product based on the user's purchase history and/or user preferences. In an example, the predictive model is an artificial neural network or other form of adaptive system model, wherein the system analyzes data and relationships to find patterns in data. In another example, the classifier model is a Gaussian Mixture Model, decision tree, Markov Decision Process, or other mathematical framework for modeling decision making. In an example, the model is trained based on historical data to predict a user's purchase intent based on previous products purchased after entry of an item on a shopping list and user preference data received by the product management computing system 130. In an example, the process is an ongoing learning process, wherein data is continuously added to the product management computing system 130 and the model is continuously updated.

In another example, the product management computing system 130 maps an identified preferred product to known merchant purchases and user preferences to predict the user's intent when entering the item on the shopping list. For example, the product management computing system 130 can predict that the user intended to purchase Brand BB chips from Merchant ABC based on the user's known preference for purchasing products at Merchant ABC, even if the user only entered "chips" on the shopping list. In another example, the user defines one or more merchants as a "preferred merchant" when entering user preferences. In yet another example, the product management computing system 130 creates a predictive model or trains a classifier model to predict a preferred product based on the user's purchase history and/or user preferences. In an example, the model is trained based on historical data to predict a user's purchase intent based on previous purchases at particular merchants after entry of an item on a shopping list and user preference data received by the product management computing system 130.

In an example, the product management computing system 130 presents the preferred product or the preferred product from the preferred merchant first in a string of products corresponding to the item on the user's shopping list. The product management computing system 130 presents the preferred product in a highlighted position in a listing of products corresponding to the item on the user's shopping list. An example highlighted position comprises a position on the left-most edge of the listing of products. In this example, additional products corresponding to the item on the user's shopping list are list to the right of the preferred product. In another example, the preferred product is positioned in the center of the user interface 121. In yet another example, the preferred product is highlighted, comprises stylized text, or comprises an icon or badge indicating that the product is preferred.

In another example, the product management computing system 130 presents the product that corresponds to the item from the shopping list (as identified in block 350) that is available from the merchant in a highlighted position in a listing of products corresponding to the item on the user's shopping list. For example, even though Merchant GHF is not a preferred merchant, a preferred product sold by Merchant GHF is presented first for another item on the user's shopping list. In this example, the product management computing system 130 would determine that a second product is available from Merchant GHF.

In an example, the user defines preferences or rules that define an order in which the product management computing system 130 assigns preferential products/merchants. For example, the user has a preference to purchase the least expensive items. In this example, the product management computing system 130 presents the least expensive product in a highlighted position in a listing of products corresponding to each item on the user's shopping list. In another example, the user has a preference to travel to the fewest number of merchants to obtain items from the shopping list. In this example, the product management computing system 130 presents products from the same merchant in a highlighted position in a listing of products corresponding to each item on the shopping list. In yet another example, the user has two or more preferences that are applied in combination or in sequential order.

In another example, the product management computing system 130 determines an order to present the remaining products in the listing of products corresponding to the item on the user's shopping list. For example, the product management computing system 130 determines which product to present in the second position to the right of the first position, in the third position to the right of the second position, and so on.

In block 390, the optimized listing of available products is displayed on the user interface 121 of the user computing device 120. In an example, the optimized listing comprises two or more products shown with at least one of the two or more products shown in a highlighted display position. In this example, showing the product in the highlighted display position directs the user's attention to the product. In an example, the determination of the optimized listing is performed in real time or near real time so that once the user presses the user interface 121 element to shop the list, the optimized display is returned to the user computing device 120.

FIG. 9 illustrates an example optimized display 900 of products on a user interface 121 of a user computing device 120. In this example, the items from the shopping list 800 (size 1 diapers 810a, milk 810b, paper towels 810c, laundry detergent 810d, hand soap 810e, baby wipes 810f, rice cereal 810g, applies 810h, and bananas 810i) are displayed in a vertical list with one or more products corresponding to each item displayed in a horizontal list on each vertical line. In another example, the vertical listing of extends beyond the visible user interface 121 screen. In this example, a scroll bar element 820 is presented to allow the user to view different portions of the user interface 121.

In an example, the user entered "diapers size 1" 810a on the shopping list 800. The product management computing system 130 determined Brand A size 1 diapers, Brand B size 1 diapers, and Brand C size 1 diapers correspond to the first item 810a on the user's shopping list 800. The product management computing system 130 also determined that Merchant X, Merchant W, and Merchant Z have size 1 diapers that correspond to the first item 810a on the user's shopping list 800. Continuing with this example, the product management computing system 130 then determined that the user has a preference for Brand A diapers based on the user's purchase history and/or user preferences. The product management computing system 130 can then predict that the user intends to purchase Brand A size 1 diapers based on the user's known preference for Brand A diapers, even if the user only entered "size 1 diapers" 810a on the shopping list 800. In this example, the product management computing system 130 lists the preferred Brand A size 1 diapers from Merchant X 910a first in position and highlights the product as a preferred product using a design element. The product management computing system 130 lists the Brand B diapers sold by Merchant W and the Brand C diapers sold by Merchant Z in the second and third positions to the right of the highlighted first position. In an example, a user interface element 950 (for example an arrow) is presented if all of the products presented on the horizontal line are not visible on the user interface 121. The arrow allows the user to scroll and view the remaining products.

In another example, the user entered "milk" 810b on the shopping list 800. The product management computing system 130 determined Brand D milk, Brand E milk, and Brand F milk correspond to the second item 810b on the user's shopping list 800. The product management computing system 130 also determined that Merchant Y, Merchant Z, and Merchant V have milk that correspond to the second item 810b on the user's shopping list 800. Continuing with this example, the product management computing system 130 then determined that the user has a preference for Brand D milk based on the user's purchase history and/or user preferences. The product management computing system 130 can then predict that the user intends to purchase Brand D milk based on the user's known preference for Brand D milk, even if the user only entered "milk" 810b on the shopping list 800. In this example, the product management computing system 130 lists the preferred Brand D milk first in position and highlights the product as a preferred product using a design element. The product management computing system 130 also determined that the user has a preference for Merchant Y 910b, and Merchant Y 910b has sufficient inventory of the preferred Brand D milk. The product management computing system 130 lists the Brand D milk sold by preferred Merchant Y 910b in the first position and highlights the merchant as a preferred merchant using a second design element. The product management computing system 130 lists the Brand E and Brand F milk sold by Merchant Z and Merchant V in the second and third positions to the right of the first position.

In yet another example, the user entered "paper towels" 810c on the shopping list 800. The product management computing system 130 determined Brand G paper towels, Brand H paper towels, and Brand I paper towels correspond to the third item 810c on the user's shopping list 800. The product management computing system 130 also determined that Merchant Y, Merchant Z, and Merchant V have paper towels that correspond to the third item 810c on the user's shopping list 800. Continuing with this example, the product management computing system 130 determined that the user does not have a preference for any of Brand G, Brand H, or Brand I paper towels based on the user's purchase history and/or user preferences. The product management computing system 130 then determined that the user has a preference for Merchant Y, and Merchant Y has sufficient inventory of Brand G paper towels. The product management computing system 130 lists the Brand G paper towels sold by preferred Merchant Y 910b in the first position and highlights the merchant as a preferred merchant using a design element. The product management computing system 130 lists the Brand H and Brand I paper towels sold by Merchant Z and Merchant V in the second and third positions to the right of the first position.

Returning to FIG. 3, the method 210 then proceeds to block 220 in FIG. 2.

Returning to FIG. 2, in block 220, the user selects a user interface element to select an available product displayed on the user interface 121 in the optimized display of available products. For example, the user hovers over, selects, or presses a button on the user interface 121 to select an available product. In another example, the user voices a command to select an available product. In an example, the user selects an available product for each group or listing of products that corresponds to each item on the shopping list.

Continuing with the previous example in FIG. 9, the user presses the "Select" user interface object 930 under the desired available product. In this example, the user presses the "Select" user interface object 930 for the Brand A Diapers, Size 1 from Merchant X 910a, the "Select" user interface object 930 for the Brand D Milk from Merchant Y 910b, and "Select" user interface object 930 for the Brand G Paper Towels from Merchant Y 910b to select these items.

Returning to FIG. 2, in block 225, the product management computing system 130 receives the selection of the selected products. In an example, the product management computing system 130 receives each selection of the user interface 121 element to select a product. In an example, the application 125 receives the user's selection of the user interface 121 element and communicates a request to the product management computing system 130. In this example, the request comprises an identifier for each selected product. In another example, the request further comprises an account identifier that corresponds to the user and/or the shopping list. In this example, the account identifier enables the product management computing system 130 to identify the user's account. In an example, the product management computing system 130 saves the selection of each selected product by associating an identifier for each selected product to an account identifier.

In block 230, the user selects a user interface 121 element to view the selected products. For example, the user hovers over, selects, or presses a button on the user interface 121 to view the selected products. In another example, the user voices a command to view the selected products. Example selected products comprise two or more products each corresponding to an item on the user's shopping list.

Continuing with the previous example in FIG. 9, the user presses the shopping cart user interface object 940 on the top right corner of the user interface. Continuing with the previous example, the user pressed the "Select" user interface object 930 for the Brand A Diapers, Size 1 from Merchant X 910a, the "Select" user interface object 930 for the Brand D Milk from Merchant Y 910b, and "Select" user interface object 930 for the Brand G Paper Towels from Merchant Y 910b to select these items. The user used the scroll bar element 820 to view additional available products and select products corresponding to the laundry detergent 810d, hand soap 810e, baby wipes 810f, rice cereal 810g, applies 810h, and bananas 810i item entries on the shopping list 800. In another example, the user selected available products that correspond to part of or a portion of the listing of items on the shopping list 800. In an example, the user selected available products from two or more different merchants (for example, Merchant X 910a and Merchant Y 910b). In another example, the user selected two or more available products from the same merchant (for example, Merchant Y 910b).

Returning to FIG. 2, in block 235, the product management computing system 130 receives the request to view the selected products. In an example, the application 125 receives the user's selection of the user interface 121 element and communicates a request to the product management computing system 130. In this example, the request comprises an identifier for each selected product. In another example, the request comprises an account identifier that corresponds to the user and/or the shopping list. In this example, the account identifier enables the product management computing system 130 to identify the user's account and retrieve saved selections of selected products.

In block 240, the product management computing system 130 prepares the listing of selected products for display on the user interface 121 of the user computing device 120. In an example, the product management computing system 130 retrieves the requested selected products. In an example, the product management computing system 130 determines which selected products corresponds to the one or more identifiers included in the request and retrieves the corresponding selected products from the data storage unit 139.

In another example, the product management computing system 130 retrieves one or more trip preferences for display on the user interface 121 of the user computing device 120. In an example, the one or more trip preferences comprises preferences entered or selected by the user and saved in the product management computing system 130 account. In another example, the one or more trip preferences comprise default preferences set by the product management computing system 130. Example trip preferences comprise an origination and end route location, a departure time, a mode of transportation, the maximum distance the user is willing to travel from the origination location, and other trip preferences.

In block 245, the listing of selected products is displayed on the user interface 121 of the user computing device 120. In an example, the product management computing system 130 transmits the prepared listing of selected products to the application 125 for display on the user interface 121. In an example, the displayed selected products comprises a listing of two or more products and a user interface 121 element that allows the user to request an optimized presentation of the two or more products. In another example, the user interface 121 element allows the user to request an optimized travel route to obtain the selected products. In yet another example, the display comprises a summary of the selected products, a prices of each selected product, a total price of the selected products, a merchant from which the selected product is available at, the trip preferences, a user interface 121 element to modify the trip preferences, and other applicable graphical display elements.

FIG. 10 illustrates an example display 1000 of selected products on a user interface 121 of a user computing device. In this example, the selected products (1010*a* through 1010*i*) that correspond to the items on the shopping list 800 (size 1 diapers 810*a*, milk 810*b*, paper towels 810*c*, laundry detergent 8410*d*, hand soap 810*e*, baby wipes 810*f*, rice cereal 810*g*, applies 810*h*, and bananas 810*i*) are displayed in a vertical list with a price associated with each selected product and a merchant where the selected product is available. For example, Brand A Size 1 Diapers 1010*a* (which corresponds to item 810*a* on the shopping list 800), Brand D Milk 1010*b* (which correspond to item 810*b* on the shopping list 800), Brand G Paper Towels 1010*c* (which correspond to item 810*c*), and so on are displayed on the user interface 121. In an example, the display of selected products comprises a user interface 121 element on the left-most edge of each line on the selected product display. For example, the user interface 121 element comprises a checkbox or button that is selectable by the user. In an example, the user can select the user interface 121 element to cross-off or indicate that the selected item was purchased.

An example display of selected products further comprises a summary of the selected items 1020. An example summary of the selected items 1020 comprises a listing of the selected merchants (for example Merchant X 910*a* and Merchant Y 910*b*), an address associated with each selected merchant, an expected total purchase price of selected products from each merchant, hours of operation for each selected merchants, and other information pertaining to the selected merchants.

In an example, the display extends beyond the visible user interface 121 screen. In this example, a scroll bar element 820 is presented to allow the user to view different portions of the user interface 121 display.

Returning to FIG. 2, in block 250, the user selects a user interface 121 element to modify preferences associated with the shopping trip. Example trip preferences comprise an origination and end route location, a departure time, a mode of transportation, the maximum distance the user is willing to travel from the origination location, and other trip preferences. In an example, the user previously defined one or more trip preferences and the saved trip preferences are displayed on the user interface 121 with the selected products. In another example, the product management computing system 130 displays default trip preference settings. In an example, the user selects a user interface 121 element that instructs the product management computing system 130 to modify the trip preferences. In this example, selectable trip preferences are displayed on the user interface 121.

Continuing with the previous example in FIG. 10, the example display of selected products further comprises a display of the user's trip preferences 1030. In an example, the display of display of the user's trip preferences 1030 comprises a user interface element to "Modify Trip Preferences" 1040. In an example, the user interface element to "Modify Trip Preferences" 1040 comprises a button, link, or selectable user interface element that enables the user to modify the displayed trip preferences 1030. In an example, the user selects the user interface element 1040 by pressing or hovering over the displayed element 1040. In an example, when the "Modify Trip Preferences" user interface element 1040 is selected, the user interface 121 displays a keyboard that allows the user to type in desired trip preferences. In another example, the user can speak into a microphone component of the user computing device 120 to modify the trip preferences. In another example, selectable trip preferences are displayed on the user interface 121.

Returning to FIG. 2, in block 255, the product management computing system 130 receives a request to modify the trip preferences. In an example, the user selects a user interface 121 element to notify the product management computing system 130 that the user has completed modifications to the trip preferences. In this example, the application 125 receives the user's modified trip preferences and communicates a request to the product management computing system 130. In this example, the request comprises an account identifier that corresponds to the user and/or the shopping list. In this example, the account identifier enables the product management computing system 130 to identify the user's account and save the modified trip preferences. In an example, the modified trip preferences are displayed on the user interface 121.

In block 260, the user selects a user interface element to optimize the trip. In an example, the user selects a user interface 121 element that instructs the product management computing system 130 to display an optimized route to the selected merchants. In another example, the user selects a user interface 121 element that instructs the product management computing system 130 to display an optimized listing of the selected products. In an example, the optimized listing of the selected products comprises an order listing of the selected products at each selected merchant. In this example, the ordered listing comprises a listing of the selected products in an optimized order according to a layout of the selected merchant's store location. For example, the optimized order corresponds to an order in which the user will obtain each product within the store location.

Continuing with the previous example in FIG. 10, the example display of selected products further comprises an "Optimize Your Trip" user interface element 1050. In an example, the user interface element to "Optimize Your Trip" 1050 comprises a button, link, or selectable user interface element. In an example, the user selects the user interface element 1050 by pressing or hovering over the displayed element 1050. In another example, the user can speak into a microphone component of the user computing device 120 to select the user interface element 1050.

Returning to FIG. 2, in block 270, the product management computing system 130 prepares an optimized list of selected items for each merchant for display on the user interface 121 of the user computing device 120. The method to prepare optimized list of selected products for display on a user interface 121 of the user computing device 120 is described in more detail hereinafter with reference to the methods described in FIG. 4. In an example, an optimized list of selected products comprises a listing of the selected products organized by selected merchant. In another example, the optimized list of selected products comprises a listing of the selected products from each selected merchant organized to optimize the travel route within the selected merchant's store location to obtain each of the selected products. In an example, the optimized travel route comprises the route requiring the least amount of expected travel time. In an example, the optimized list comprises placing the selected products in an order that corresponds to the optimized route of travel within the store location.

Figure 4:
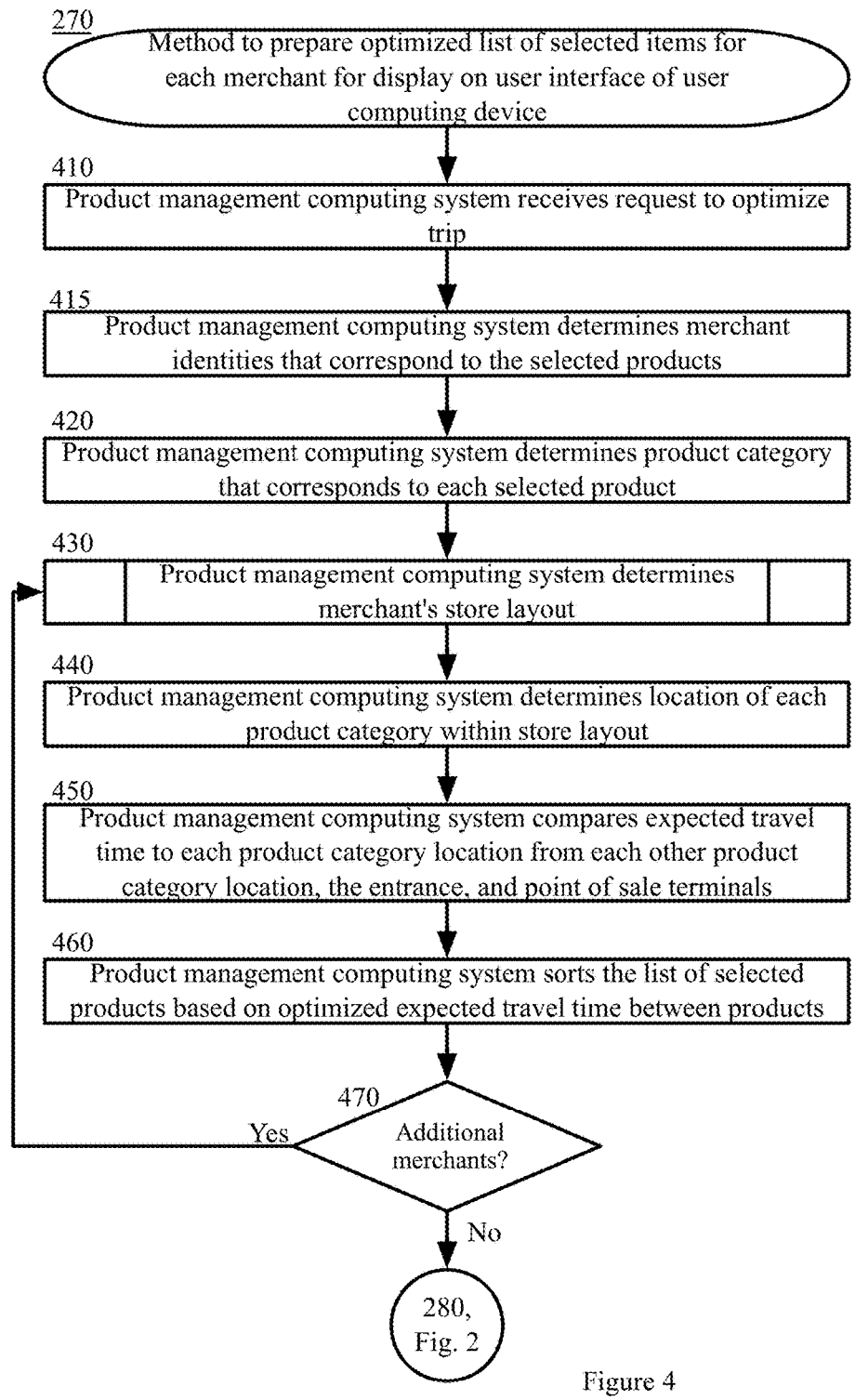
FIG. 4 is a block flow diagram depicting a method to prepare optimized list of selected items for display on a user interface, in accordance with certain examples.

FIG. 4 is a block flow diagram depicting a method 270 to prepare optimized list of selected items for display on a user interface 121 of the user computing device 120, in accordance with certain examples, as referenced in block 270. The method 270 is described with reference to the components illustrated in FIG. 1.

In block 410, the product management computing system 130 receives the request to optimize the trip. In an example, the application 125 transmits a request to the product management computing system 130 that comprises one or more identifiers that enable the product management computing system 130 to identify the selected products and the user's trip preferences. In an example, the one or more identifiers comprise the user account identifier and/or the shopping list identifier. In this example, the user's trip preferences are saved in an account corresponding to the account identifier.

In block 415, the product management computing system 130 determines merchant identities that correspond to the selected products. In an example, the one or more identifiers that enable the product management computing system 130 to identify the selected products further enable the product management computing system 130 to identify the merchant selling the selected product. In an example, the merchant selling the product comprises the merchant with an available inventory of the selected product. Continuing with the previous example in FIG. 10, the selected merchants are Merchant X 910a and Merchant Y 910b. In an example, the selected merchants are displayed in a summary section 1020 on the user interface 121.

Returning to FIG. 4, in block 420, the product management computing system 130 determines a product category that corresponds to each of the selected products. An example category comprises a grouping or descriptor common to multiple products. In an example, merchants organize a store layout to present products belonging to the same category within the same location, aisle, display, or section of the store. In another example, certain categories of products are sold by different merchants. For example, categories found in a grocery store may comprise beverages, bakery, dairy, frozen foods, meat, produce, cleaners, paper goods, personal care, pharmacy, pet items, baby items, school supplies, and so forth. In another example, categories found within a baby store may comprise diapers, clothing, wipes, baby food, baby furniture, baby toys, car seats, strollers, feeding items, and so on.

In another example, a product can belong to more than one category. In this example, the product may comprise a sub-category. For example, diapers, wipes, baby food, baby furniture, baby toys, car seats, strollers, feeding items, and so on belong in the "baby item" category. However, specific types of diapers, for example, Brand PP Size 1 diapers belong in the subcategory of "diapers."

In an example, the product management computing system 130 determines the product category associated with a product identifier transmitted in the request to optimize the trip. In another example, the product category is determined in block 350 when the product management computing system 130 determines products that match each item on the shopping list. In this example, the product management computing system 130 retrieves the category associated with each selected product.

In block 430 the product management computing system 130 determines the merchant's store layout. The method to determine a merchant's store layout is described in more detail hereinafter with reference to the methods described in FIG. 4.

Figure 5:
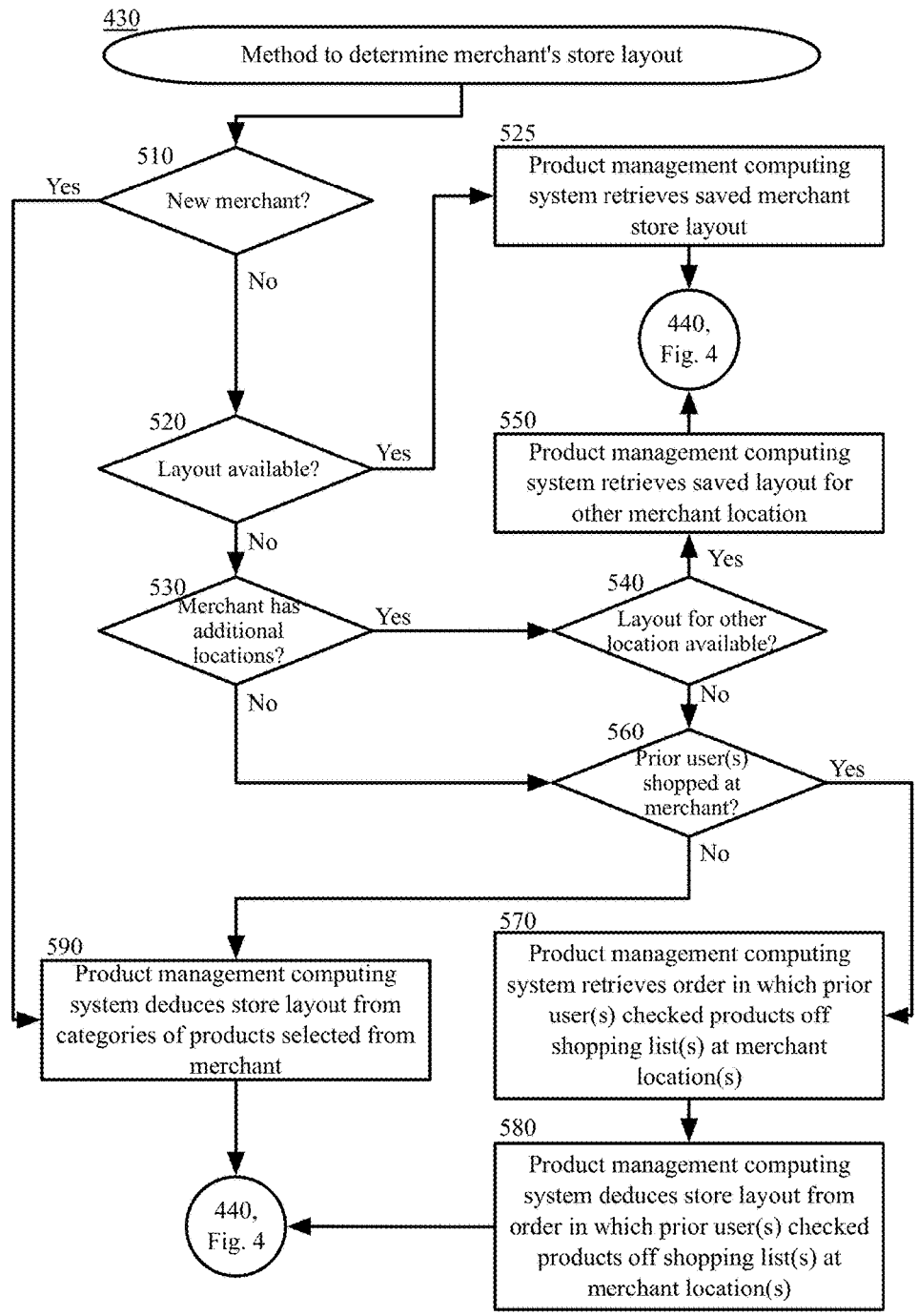
FIG. 5 is a block flow diagram depicting a method to determine a merchant's store layout, in accordance with certain examples.

FIG. 5 is a block flow diagram depicting a method 430 to determine a merchant's store layout, in accordance with certain examples, as referenced in block 430. The method 430 is described with reference to the components illustrated in FIG. 1. An example store layout comprises the design in which the store's interior is set up. In an example, the store layout comprises a design of the store's floor space and the placement of products within that store. In an example, products are presented on shelving units, hanging from the walls, placed or stacked on the floor, on tables, or other forms of displays. In another example, a store layout comprises placement of products that aids in customer flow and ambiance within the store.

In block 510, the product management computing system 130 determines whether the selected merchant is a new merchant. In an example, a new merchant comprises a merchant for which the product management computing system 130 does not have a saved store layout, or for which a prior user has not selected and purchased products from. In an example, the product management computing system 130 compares the identity of the merchant determined in block 415 to a database of known merchants.

If the selected merchant is a new merchant, the method 430 proceeds to block 590.

Returning to block 510, if the selected merchant is not a new merchant, the method 430 proceeds to block 520. In block 520, the product management computing system determines whether a store layout is available for the selected merchant. In an example, merchant computing systems 110 communicate a store layout to the product management computing system 130. In another example, a user, product management computing system 130 operator, or another party provides a store layout. In an example, the store layouts are associated with a merchant identifier and saved in the data storage unit 139.

If the store layout for the selected merchant is available, the method 430 proceeds to block 525. In block 525, the product management computing system 130 retrieves the saved store layout for the selected merchant. In an example, the product management computing system 130 retrieves the saved store layout from the data storage unit 139.

The method 430 then proceeds to block 440 in FIG. 4.

Returning to FIG. 5, if the store layout for the selected merchant is not available, the method 430 proceeds to block 530. In block 530, the product management computing system 130 determines whether the selected merchant has additional store locations. In an example, a merchant maintains a similar store layout across multiple store locations.

For example, Big Box Store LMN has 1000 store locations across the United States. In this example, each of the 1000 store locations has a similar store layout. So, if the product management computing system 130 has a store layout for one of the locations, it can assume the store layout for the remaining store locations is the same or similar.

If the selected merchant has additional store locations, the method 430 proceeds to block 540. In block 540, the product management computing system 130 determines whether a store layout is available for one of the other locations associated with the selected merchant.

If a store layout is available for one of the other locations associated with the selected merchant, the method 430 proceeds to block 550. In block 550, the product management computing system 130 retrieves the saved store layout for the other location associated with the selected merchant. In an example, the product management computing system 130 retrieves the saved store layout from the data storage unit 139.

The method 430 then proceeds to block 440 in FIG. 4.

Returning to block 540 in FIG. 5, if the store layout is not available for one of the other locations associated with the selected merchant, the method 430 proceeds to block 560.

Returning to block 530 in FIG. 5, if the selected merchant does not have additional store locations, the method 430 proceeds to block 560. In block 560, the product management computing system 130 determines whether one or more prior users have shopped at the selected merchant or other locations associate with the selected merchant. In an example, the product management computing system 130 determines whether another user has selected products at the selected merchant. In another example, the product management computing system 130 determines whether another user has purchased selected products at the selected merchant. In this example, the product management computing system 130 has a saved listing of the products selected by the previous user and has an order in which the user has crossed off the products from the list.

If one or more prior users have shopped at the selected merchant, the method 430 proceeds to block 570. In block 570, the product management computing system 130 retrieves an order in which prior users have checked products off their shopping lists at the merchant location. In an example, the user crosses off an item after it is picked up by the user. For example, the user selects a user interface element to mark the item as obtained or picked up as the user is traveling through the store location. In this example, the product management computing system 130 can determine the order in which the items were crossed off the list by retrieving time stamps associated with selection of each user interface 121 element to cross off each item.

In block 580, the product management computing system 130 deduces the store layout from the order in which prior users checked products off of their shopping lists which at the store location. In an example, the product management computing system 130 can determine that the user was at the store location using a GPS or other form of location determination associated with the user computing device 120. In this example, an indication of the location of the user computing device 120 is associated with the selection the user interface 121 elements. In an example, the product management computing system 130 creates a predictive model or trains a classifier model to predict a store layout based on the order in which users check products off their shopping list. In an example, the predictive model is an artificial neural network or other form of adaptive system model, wherein the system analyzes data and relationships to find patterns in data. In another example, the classifier model is a Gaussian Mixture Model, decision tree, Markov Decision Process, or other mathematical framework for modeling decision making. In an example, the model is trained based on historical data to predict a store layout based on an order in which previous products are marked off a shopping list. In an example, the process is an ongoing learning process, wherein data is continuously added to the product management computing system 130 and the model is continuously updated.

The method 430 then proceeds to block 440 in FIG. 4.

Returning to FIG. 5, in block 560, if one or more prior users have not shopped at the selected merchant or other locations associate with the selected merchant, the method 430 proceeds to block 590.

Returning to block 510, if the selected merchant is a new merchant, the method 430 proceeds to block 590. In block 590, the product management computing system 130 deduces the store layout from the categories of products selected from the merchant. In an example, the product management computing system 130 determines an order in which users typically shop for products in a given store. In this example, by determining the categories of products selected, the product management computing system 130 can determine the type of store. For example, if the selected products are diapers, wipes, bibs, and baby food, the product management computing system 130 determined that the category associated with these types of products is baby items. If no other products are selected, the product management computing system 130 can determine that the selected merchant is a baby store.

In an example, users typically shop a store in a similar pattern or order. For example, users typically start at one end of the store nearest to the entrance and proceed through the store in order of the shelves/displays until they reach the point-of-sale devices. By following known user behavior, the product management computing system 130 can deduce the layout of a store without knowledge of the store. In an example, the product management computing system 130 creates a predictive model or trains a classifier model to predict a store layout based on the order in users proceed through a store location based on the categories associated with the selected products. In an example, the predictive model is an artificial neural network or other form of adaptive system model, wherein the system analyzes data and relationships to find patterns in data. In another example, the classifier model is a Gaussian Mixture Model, decision tree, Markov Decision Process, or other mathematical framework for modeling decision making. In an example, the model is trained based on historical data to predict a store layout based on an order in which user proceed through different types of stores. In an example, the process is an ongoing learning process, wherein data is continuously added to the product management computing system 130 and the model is continuously updated.

The method 430 then proceeds to block 440 in FIG. 4.

Returning to FIG. 4, in block 440, the product management computing system 130 determines the location of each product category within the store layout. In an example, the store layout is known and the product management computing system 130 matches the category or sub-category of product determined in block 420 to a category of product display from the store layout. In another example, the store layout is deduced, and the product management computing system 130 matches the category or sub-category of product determined in block 420 to an expected product display location.

FIG. 11 illustrates an example optimized display 1100 of a store layout. In this example, the store layout 1100 of Merchant X 910a is determined. The user selected Size 1 Brand A Diapers 1010a, Brand L Baby Wipes 1010f, and Brand M Baby Rice Cereal 1010g from Merchant X 910. Each of items 1010a, 1010f, and 1010g are classified into the baby items category. No additional items are selected from Merchant X 910a. In this example, the product management computing system 130 can deduce that Merchant X 910a is a baby store. In an example, the Size 1 Brand A Diapers 1010a can be furthered classified as diapers 1120b, the Brand L Baby Wipes 1010f can be further classified as wipes 1120c, and the Brand M Baby Rice Cereal 1010g can be further classified as baby food 1120a.

In this example, the product management computing system 130 can determine the expected location of the Size 1 Brand A Diapers 1010a, Brand L Baby Wipes 1010f, and Brand M Baby Rice Cereal 1010g within the store layout 1100 of Merchant X 910 by determining the location of the categories associated with these products (for example, 1120a, 1120b, and 1120c).

Returning to FIG. 4, in block 450, the product management computing system 130 compares the expected travel time to each product category display location to each of the other product category display locations, the store entrance, and the point of sale terminals. In an example, the product management computing system 130 determines the expected travel time to travel from each product display to each of the other product displays. In another example, the product management computing system 130 determines the expected travel time from the store entrance to each product display. In yet another example, the product management computing system 130 determines the expected travel time from each product display to the point of sale terminals. In these examples, the product management computing system 130 is using the determined expected travel times to determine an optimized route of travel within the store location. In an example, the product management computing system 130 can determine the distance between displays within the store location. Using the determined distance and an expected rate of travel, the product management computing system 130 can determine the expected travel time.

Continuing with the previous example in FIG. 11, the product management computing system 130 calculates the following expected travel times:
1. The entrance 1105 to the baby food 1120a,
2. The entrance 1105 to the diapers 1120b,
3. The entrance 1105 to the wipes 1120c,
4. The baby food 1120a to the diapers 1120b,
5. The baby food 1120a to the wipes 1120c,
6. The baby food 1120a to the point of sale 1130,
7. The diapers 1120b to the wipes 1120c,
8. The diapers 1120b to the point of sale 1130, and
9. The wipes 1120c to the point of sale 1130.

Returning to FIG. 4, in block 460, the product management computing system 130 sorts the list of selected products based on the optimized expected travel time within the store location. In an example, the product management computing system 130 determines the optimized travel route within the store location to obtain each of the selected products. In an example, the optimized travel route comprises the route requiring the least amount of expected travel time. In an example, the selected products are placed in an order that corresponds to the optimized route of travel within the store location. For example, if the optimized route of travel within the store location was to obtain product 3, then product 2, then product 1, the products would be presented on a list as product 3, product 2, product 1. In this example, the optimized presentation of the selected items corresponds to an ordered list in which the user can cross off the first presented item as it is selected, then the second presented item, and so forth.

Continuing with the previous example in FIG. 11, the product management computing system 130 determines that the optimized travel route comprises:
1. The entrance 1105 to the baby food 1120a,
2. The baby food 1120a to the diapers 1120b,
3. The diapers 1120b to the wipes 1120c, and
4. The wipes 1120c to the point of sale 1130.

Returning to FIG. 4, in block 470, the product management computing system 130 determines whether the user has an additional selected merchant. In an example, the user has selected items from two or more merchants. In this example, the product management computing system 130 completes the methods described in blocks 430 through 460 for each selected merchant.

If the user has an additional selected merchant, the method 270 proceeds to block 430.

Returning to block 470, if the user does not have an additional selected merchant, the method 270 proceeds to block 280 in FIG. 2.

Returning to FIG. 2, In block 280 the product management computing system 130 prepares an optimized travel route to the selected merchants for display on the user interface 121 of the user computing device 120. The method to prepare an optimized travel route for display on a user interface 121 of the user computing device 120 is described in more detail hereinafter with reference to the methods described in FIGS. 6-7. In an example, the optimized travel route comprises a listing of destination points to obtain all the selected items prioritized to take the least amount of combined shopping and travel time. In another example, the optimized travel route comprises a listing of destination points to obtain all the selected items prioritized by a type or category of items that is optimally purchased last before the user returns home. In another example, the optimized travel route comprises a listing of directions to proceed from the user's origination point to each selected merchant and then to the user's end point, organized according to prioritized travel and user preferences.

Figure 6:
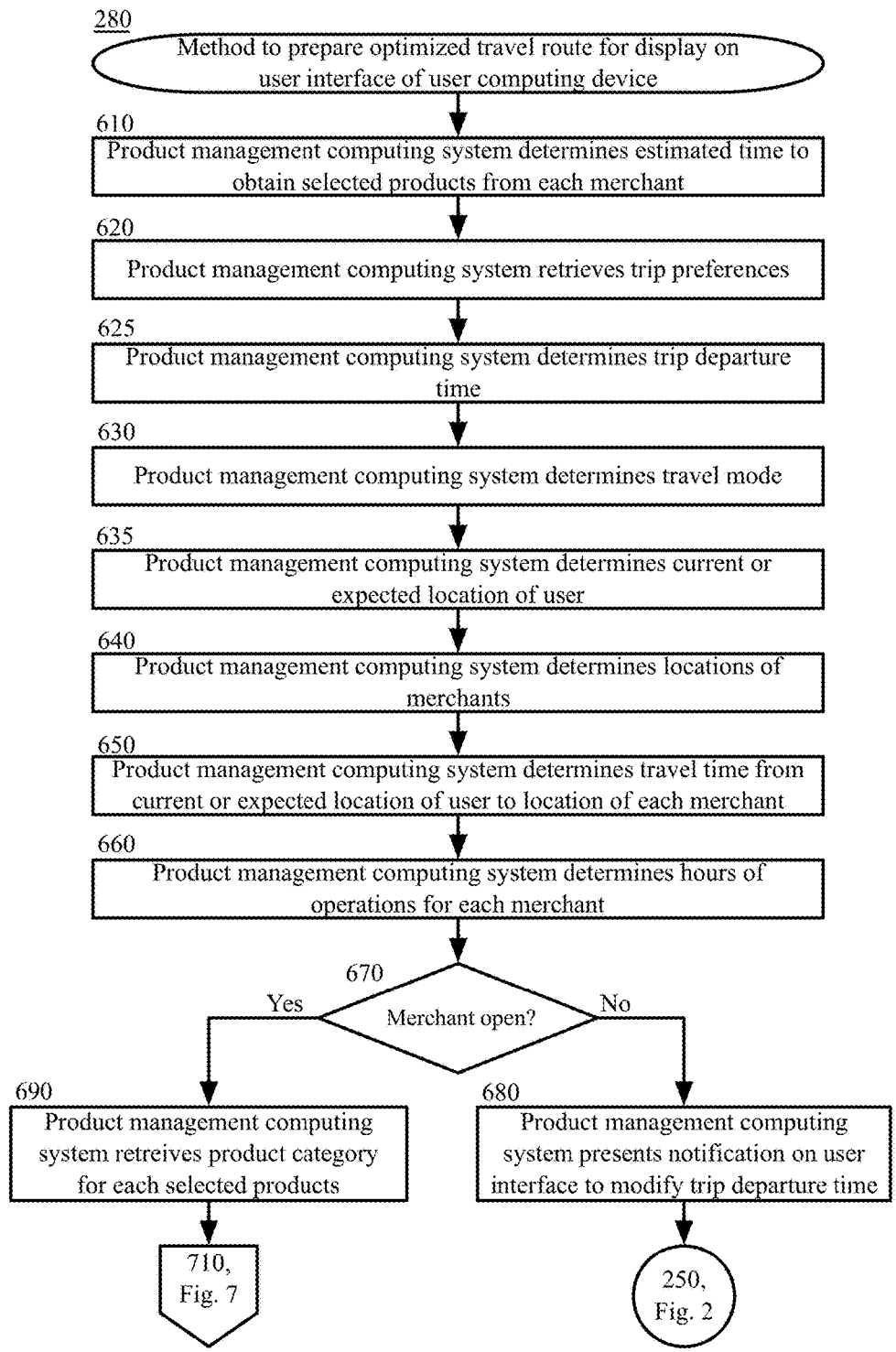
FIG. 6 is a block flow diagram depicting a method to prepare an optimized travel route for display on a user interface, in accordance with certain examples.
Figure 7:
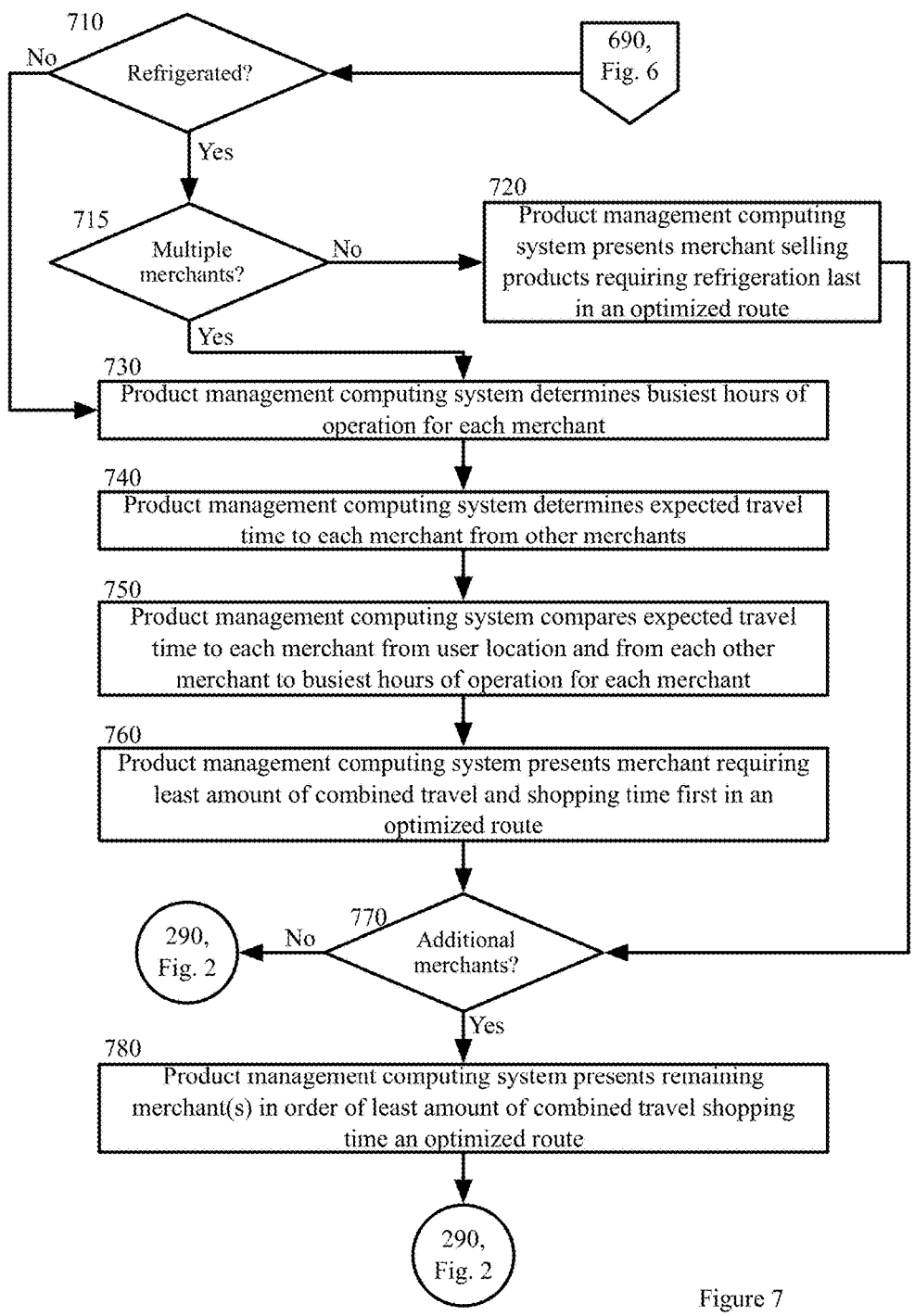
FIG. 7 is a block flow diagram depicting a method to prepare an optimized travel route for display on a user interface, in accordance with certain examples.

FIGS. 6-7 are block flow diagram depicting a method 280 to prepare an optimized travel route for display on a user interface 121 of the user computing device 120, in accordance with certain examples, as referenced in block 280. The method 280 is described with reference to the components illustrated in FIG. 1.

In block 610, the product management computing system 130 determines an estimated time to obtain the selected products from each selected merchant. In an example, the product management computing system 130 determined an optimized travel route within each selected merchant's store location based on the expected time to travel between the selected products within the store location. In an example, the estimated time to obtain the selected products correspond to the expected time to travel between the selected products, plus additional time to complete the point of sale transaction. In another example, the estimated time further comprises an expected time to park and walk into the store. In this example, the product management computing system 130 can obtain a map that illustrates a location of the nearest parking and can calculate an expected time to park and walk to the store based on the distance between the parking and the store.

In block 620, the product management computing system 130 retrieves the user's trip preferences. In an example, the trip preferences comprises preferences entered or selected by the user and saved in the product management computing system 130 account. In another example, the trip preferences comprise default preferences set by the product management computing system 130. In another example, the trip preferences were modified by the user prior to requesting display of the optimized trip. Example trip preferences comprise an origination and end route location, a departure time, a mode of transportation, the maximum distance the user is willing to travel from the origination location, and other trip preferences.

In block 625, the product management computing system 130 determines a trip departure time. An example trip departure time comprises a time in which the optimized trip will begin. In an example, the user modified the trip departure time to correspond to a time in which the user desires to begin the shopping trip. In an example, the product management computing system 130 determines the travel mode for the trip by reviewing the retrieved trip preferences. Continuing with a previous example in FIG. 10, the trip departure time displayed in the trip preferences 1030 is 1:15 PM.

Returning to FIG. 6, in block 630, the product management computing system 130 determines a travel mode for the trip. In an example, the travel mode for the trip comprises a mode by which the user will travel to each selected merchant store location. Example travel modes comprise by car, bus, bike, and walking. In an example, the product management computing system 130 determines the travel mode for the trip by reviewing the retrieved trip preferences. Continuing with a previous example in FIG. 10, the travel displayed in the trip preferences 1030 is car.

Returning to FIG. 6, in block 635, the product management computing system 130 determines the current or expected location of the user. In an example, the expected location of the user comprises a location from which the user expects to depart from to begin the travel route or to end at after completion of the travel route. In an example, the product management computing system 130 determines the expected location for the trip by reviewing the retrieved trip preferences. In another example, the product management computing system 130 determines the current location of the user computing device 120. Continuing with a previous example in FIG. 10, the origination location and end route location displayed in the trip preferences 1030 is the user's current location.

Returning to FIG. 6, in block 640, the product management computing system 130 determines store locations for each merchant. In an example, the product management computing system 130 retrieves an address of a store location associated with the merchant's store location. Continuing with a previous example in FIG. 10, the merchant locations displayed in the summary section 1020 is the 123 Front Street, Any Town for Merchant X and 456 Main Street, Any Town for Merchant Y.

Returning to FIG. 6, in block 650, the product management computing system 130 determines the expected travel time from the current or expected location of the user to the store location for each selected merchant. In an example, the product management computing system 130 calculates the expected travel time at the departure time to each location using the designated travel mode. In this example, the product management computing system 130 can retrieve or calculate a distance between the origination location and each merchant location. The product management computing system 130 can also retrieve or calculate the distance between each merchant location and each other merchant location. The product management computing system 130 can further calculate the distance between each merchant location and the end route location. Based on the calculated distances, the product management computing system 130 can determine the expected travel time between each location. In another example, the product management computing system 130 can retrieve expected traffic around the departure time. In this example, the product management computing system 130 can adjust the travel times based on expected traffic. Continuing with the previous example in FIG. 10, the product management computing system 130 determines the following expected travel times:

1. Current location to Merchant X,
2. Current location to Merchant Y, and;
3. Merchant X to Merchant Y.

Returning to FIG. 6, in block 660, the product management computing system 130 determines the hours of operations for each merchant. In an example, the product management computing system 130 retrieves the hours of operation from the data storage unit 139.

In block 670, the product management computing system 130 determines whether the merchants are open at a time in which the user is expected to be arriving at the merchant location. In an example, the product management computing system 130 determines a time at which the user is expected to be arriving at the merchant location by adding the expected travel time to the merchant location to the departure time. In another example, the product management computing system 130 determines a time at which the user is expected to be arriving at a merchant location by compiling the expected travel time between merchants with the expected time the merchant will be shopping at the first merchant, and the the expected travel time to the first merchant location. In an example, the product management computing system 130 compares the expected arrival time to the the hours of operation.

If the merchant store location will not be open when the user is expected to arrive, the method 280 proceeds to block 680. In block 680, the product management computing system 130 presents a notification of the user interface 121 of the user computing device 120 to modify the trip departure time. In an example, the product management computing system 130 transmits a notification to the application 125 and a notification is displayed on the user interface 121. An example notification comprises a window, banner, alert, or other user interface element that draws the user's attention to the error.

From block 680, the method 280 proceeds to block 250 in FIG. 2 and the user modifies the trip preferences.

Returning to block 670 in FIG. 6, if the merchant store location will be open when the user is expected to arrive, the method 280 proceeds to block 690. In block 690, the product management computing system 130 retrieves the product categories of the selected products. In an example, the product categories were determined in block 420 in FIG. 4.

The method 280 then proceeds to block 710 in FIG. 7. In block 710, the product management computing system 130 determines whether the selected product requires refrigeration or is frozen. In an example, the product management computing system 130 compares the product category to a list of categories that commonly require refrigeration or are frozen. For example, the product category dairy will likely require refrigeration or ice cream will likely be frozen.

If the product category does not require refrigeration or is not frozen, the method 280 proceeds to block 730.

Returning to block 710, if the product category requires refrigeration or is frozen, the method 280 proceeds to block 715. In block 715, the product management computing system 130 determines whether the selected products from multiple merchants require refrigeration or are frozen. In an example, the product management computing system 130 determines a merchant that corresponds to each product identified in block 710.

If the selected products requiring refrigeration or a freezer are not from multiple merchants, the method 280 proceeds to block 720. In block 720, the product management computing system 130 presents the merchant selling the selected products requiring refrigeration or a freezer last in the optimized route. In an example, the user will purchase the selected products requiring refrigeration or a freezer last so that these products do not melt or spoil while the user is visiting a different merchant.

The method 280 then proceeds to block 770.

Returning to block 715, if the selected products requiring refrigeration or a freezer are from multiple merchants, the method 280 proceeds to block 730. In block 730, the product management computing system 130 determines the busiest hours of operation for each selected merchant. In an example, the product management computing system 130 compares location data associated with user computing devices to the store location's hour of operation to determine the times when the most users are within the store location. In another example, the product management computing system 130 compares time stamps associated with users checking off selected items from shopping lists while within the store location to determine times when the most users are within the store location. In yet another example, the product management computing system 130 compares maps and satellite data to the store location's hour of operation to determine the times when the most users are within the store location.

In block 740, the product management computing system 130 determines the expected travel time to each selected merchant store location from each of the other selected merchant store locations. In an example, the product management computing system 130 retrieves the calculated travel times from the times calculated in block 650 in FIG. 6.

In block 750, the product management computing system 130 compares the expected travel time to each selected merchant from the user location and from each other selected merchant to the busiest hours of operation for each merchant. In an example, the product management computing system 130 calculates the expected travel time at the departure time to each location using the designated travel mode. In this example, the product management computing system 130 can retrieve or calculate a distance between the origination location and each merchant location. The product management computing system 130 can also retrieve or calculate the distance between each merchant location and each other merchant location. The product management computing system 130 can further calculate the distance between each merchant location and the end route location. Based on the calculated distances, the product management computing system 130 can determine the expected travel time between each location. In another example, the product management computing system 130 can retrieve expected traffic around the departure time. In this example, the product management computing system 130 can adjust the travel times based on expected traffic. In another example, the product management computing system 130 can further adjust the travel times based on how busy each merchant is expected to be. In this example, the product management computing system 130 can compare travel times to expected shopping times based on how busy the merchant is expected to be at a time when the user is expected to arrive at the merchant's store location.

In block 760, the product management computing system 130 presents the merchant requiring the least amount of combined travel and shopping time first in an optimized route. In an example, the product management computing system 130 presents the merchant requiring the least amount of combined travel and shopping time second or after a prioritized merchant in an optimized route.

In block 770, the product management computing system 130 determines whether there are additional selected merchants to add to the optimized travel route. In an example, the product management computing system 130 compares the merchants listed in the optimized travel route to the selected merchants.

If there are no additional selected merchants to add to the optimized travel route, the method 280 proceeds to block 290 in FIG. 2.

Returning to block 770, if there are additional selected merchants to add to the optimized travel route, the method 280 proceeds to block 780. In block 780, the product management computing system 130 presents the remaining selected merchants in order of the least amount of combined travel and shopping time. In an example, the optimized travel route comprises a listing of destination points to obtain all the selected items prioritized to take the least amount of combined shopping and travel time. In another example, the optimized travel route comprises a listing of destination points to obtain all the selected items prioritized by a type or category of items that is optimally purchased last before the user returns home. In another example, the optimized travel route comprises a listing of directions to proceed from the user's origination point to each selected merchant and then to the user's end point, organized according to prioritized travel and user preferences.

The method 280 then proceeds to block 290 in FIG. 2.

Returning to FIG. 2, in block 290, the optimized travel route to the selected merchants and the optimized shopping list for each selected merchant is displayed on the user interface 121 of the user computing device 120. In an example, the product management computing system 130 transmits the optimized travel route to the selected merchants and the optimized shopping list for each selected merchant to the application 125 for display on the user interface 121.

FIGS. 12-13 illustrate an example display 1200 of an optimized display of travel routes and selected items on a user interface 121 of a user computing device 120. In these examples, the product management computing system 130 determined the optimized route for the user to travel to obtain each of the selected products. In this example, the optimized display comprises a listing of multiple expandable displays in a vertical line on the user interface 121. In an example, the vertical listing of extends beyond the visible user interface 121 screen. In this example, a scroll bar element 820 is presented to allow the user to view different portions of the user interface 121 display 1200. In another example, each display is expandable and compressible by selecting a user interface 121 element 1260. By expanding and compressing each display, the user can select which sets of information to display on the user interface.

In an example, the optimized display of travel routes and selected items comprises a display of one or more of the optimized travel route 1220, a map 1230, itemized travel directions 1250, and optimized shopping lists 1340a and 1340b. Continuing with the previous example, the user selected products from Merchant X 910a and Merchant Y 910b. In this example, the user selected trip preferences 1030 that defined the origination location and the end route location to be the current location and the departure time to be 1:15 PM. The product management computing system 130 determined the optimized travel route 1220 based at least in part on the trip preferences 1030. In this example, the product management computing system 130 determined that the estimated travel time for completing the optimized travel route is two hours. In an example, the optimized travel route 1220 is displayed on the user interface 121.

In an example, the optimized display of the travel route comprises a displayed map 1230 illustrating the optimized travel route. In this example, the user begins the travel route at the current location, travels 20 minutes by car 1230c to Merchant X 910a, and spends 20 minutes obtaining the selected items at Merchant X 1230a. The user then travels 10 minutes by car 1230c to Merchant Y 910b, and spends 1 hour obtaining the selected items at Merchant y 1230b. The user then travels 10 minutes by car 1230d back the current location and ends the travel route.

In another example, the optimized display of the travel route comprises itemized travel directions 1250. In this example, the displayed travel directions 1250 comprise a step-by-step listing of instructions for traveling from the origination location to each merchant store location and then to the end route location.

In an example, the optimized display of the selected items comprises a selectable display of each selected item from each selected merchant. In an example, the user can select a user interface 121 element to cross off or mark an item as obtained once the user finds the item and places it in a shopping basket. In an example, the selected products are displayed in a vertical list in an optimized order in which the user obtains the items. Continuing with the previous example, the product management computing system 130 determined the optimized order to present the three selected items from Merchant X 910a using the Merchant X store layout 1100. In this example, the product management computing system 130 determined that that optimized route for the user to travel within the store would begin with the baby food section 1120a. Accordingly, the Brand M Baby Rice Cereal 1010g is displayed first in the optimized shopping list for Merchant X 1340a. Continuing with this example, based on the Merchant X 910a store layout 1100, the product management computing system 130 determined that the next optimum stop is the diapers 1120b. Accordingly, the Size 1 Brand A Diapers 1010a are displayed second on the optimized shopping list for Merchant X 1340a. Continuing with this example, based on the Merchant X 910a store layout 1100, the product management computing system 130 determined that the next optimum stop prior to the point of sale terminal 1130 is the wipes 1120c. Accordingly, the Brand L Baby Wipes Refill Pack 1010f is displayed last on the optimized shopping list for Merchant X 1340a.

Other Example Embodiments

FIG. 14 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a router or other network node, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCP"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain example embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with an opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the scope of the following claims, which are to be accorded the broadest interpretation so as to encompass such alternate embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to optimize object presentation on user interfaces, comprising:
   receiving, by one or more computing devices, three or more first notifications of selection of first user interface elements on a user computing device requesting selection of three or more objects, each of the three of more objects associated with either a first location or a second location;
   receiving, by the one or more computing devices, a second notification of selection of a second user interface element on the user computing device requesting an optimized display of the three or more selected objects;
   analyzing, by the one or more computing devices, a layout of the first location associated with at least two of the three or more selected objects by:
      determining the layout of the first location,
      determining a category of each of the at least two of the three or more selected objects,
      determining a location of each category within the layout of the first location, and
      determining a first optimized route between each category within the layout of the first location;
   analyzing, by the one or more computing devices, routes to the first location and the second location associated with at least one of the three or more selected objects by:
      determining a first least optimal time associated with the first location and a second least optimal time associated with the second location,
      determining a first time to arrive at the first location and complete the first optimized route between each category within the first location,
      determining a second time to arrive at the second location and complete a second optimized route within the second location, and
      determining an order to the first location and the second location to optimize arrival at a time other than a least optimal time; and
   rendering, by the one or more computing devices, an optimized display of the three or more selected objects on the user interface of the user computing device with an optimized route to the first location and the second location with the at least two of the three or more selected objects in an order corresponding to the optimized first route between each category within the layout of the first location.

2. The computer-implemented method of claim 1, wherein the three or more selected objects are associated with two or more different locations.

3. The computer-implemented method of claim 2, further comprising analyzing, by the one or more computing devices, a second layout of the second location associated with the at least one of the three or more selected objects.

4. The computer-implemented method of claim 1, further comprising:
   receiving, by the one or more computing devices, a request to render a listing of item entries on the user interface of the user computing device, the listing of item entries comprising three or more item entries;
   receiving, by the one or more computing devices, a notification of selection of a user interface element on the user computing device requesting presentation of objects corresponding to each of the three or more item entries; and
   rendering, by the one or more computing devices, two or more first objects that correspond to a first of the three or more item entries, two or more second objects that correspond to a second of the three or more item entries, and two or more third objects that correspond to a third of the three or more item entries.

5. The computer-implemented method of claim 4, wherein the three or more selected objects comprise at least one of the two or more first objects, at least one of the two or more second objects, and at least one of the two or more third objects.

6. The computer-implemented method of claim 1, wherein determining the layout of the first location comprises determining, by the one or more computing devices, orders in which prior objects were selected from lists of prior selected objects at the first location.

7. The computer-implemented method of claim 1, wherein analyzing the routes to the first location and the second location further comprises determining, by the one or more computing devices, user preferences.

8. The computer-implemented method of claim 1, further comprising rendering, by the one or more computing devices, the at least one of the three or more selected objects in an order corresponding to an optimized second route between each category within a second layout of the second location.

9. The computer-implemented method of claim 1, wherein the order corresponding to the optimized first route between each category within the layout of the first location comprises a vertical listing of each of the at least two of the three or more selected objects.

10. A computer program product, comprising:
a non-transitory computer-readable storage device having computer-executable program instructions embodied therein that when executed by a computer cause the computer to optimize object presentation of user interfaces, the computer-readable program instructions comprising:
  computer-readable program instructions to receive three or more first notifications of selection of first user interface elements on a user computing device requesting selection of three or more objects;
  computer-readable program instructions to receive a second notification of selection of a second user interface element on the user computing device requesting an optimized display of the three or more selected objects;
  computer-readable program instructions to analyze a layout of a first location associated with at least two of the three or more selected objects by:
    determining the layout of the first location,
    determining a category of each of the at least two of the three or more selected objects,
    determining a location of each category within the layout of the first location, and
    determining a first optimized route between each category within the layout of the first location;
  computer-readable program instructions to analyze routes to the first location and a second location associated with at least one of the three or more selected objects by:
    determining a first least optimal time associated with the first location and a second least optimal time associated with the second location,
    determining a first time to arrive at the first location and complete the first optimized route between each category within the first location,
    determining a second time to arrive at the second location and complete a second optimized route within the second location, and
    determining an order to the first location and the second location to optimize arrival at a time other than a least optimal time; and
  computer-readable program instructions to render an optimized display of the three or more selected objects on the user interface of the user computing device with an optimized route to the first location and the second location with the at least two of the three or more selected objects in an order corresponding to the optimized first route between each category within the layout of the first location.

11. The computer program product of claim 10, wherein the three or more selected objects are associated with two or more different locations.

12. The computer program product of claim 10, wherein determining the layout of the first location comprises determining orders in which prior objects were selected from lists of prior selected objects at the first location.

13. The computer program product of claim 11, further comprising computer-readable program instructions to analyze a second layout of the second location associated with the at least one of the three or more selected objects.

14. The computer program product of claim 10, wherein analyzing the routes to the first location and the second location further comprises determining user preferences.

15. The computer program product of claim 10, further comprising computer-readable program instructions to render the at least one of the three or more selected objects in an order corresponding to an optimized second route between each category within a second layout of the second location.

16. A system to optimize object presentation on user interfaces, comprising:
a storage device; and
a processor communicatively coupled to the storage device, wherein the processor executes application code instructions that are stored in the storage device to cause the system to:
  receive three or more first notifications of selection of first user interface elements on a user computing device requesting selection of three or more objects;
  receive a second notification of selection of a second user interface element on the user computing device requesting an optimized display of the three or more selected objects;
  analyze a layout of a first location associated with at least two of the three or more selected objects by:
    determining the layout of the first location,
    determining a category of each of the at least two of the three or more selected objects,
    determining a location of each category within the layout of the first location, and
    determining a first optimized route between each category within the layout of the first location;
  analyze routes to the first location and a second location associated with at least one of the three or more selected objects by:
    determining a first least optimal time associated with the first location and a second least optimal time associated with the second location,
    determining a first time to arrive at the first location and complete the first optimized route between each category within the first location,
    determining a second time to arrive at the second location and complete a second optimized route within the second location, and
    determining an order to the first location and the second location to optimize arrival at a time other than a least optimal time; and
  render an optimized display of the three or more selected objects on the user interface of the user computing device with an optimized route to the first location and the second location with the at least two of the three or more selected objects in an order corresponding to the optimized first route between each category within the layout of the first location.

17. The system of claim 16, wherein the three or more selected objects are associated with two or more different locations.

18. The system of claim 16, wherein determining the layout of the first location comprises determining orders in which prior objects were selected from lists of prior selected objects at the first location.

19. The system of claim 16, wherein analyzing the routes to the first location and the second location further comprises determining user preferences.

20. The system of claim 16, wherein the processor is further configured to execute application code instructions stored in the storage device to cause the system to render the at least one of the three or more selected objects in an order corresponding to an optimized second route between each category within a second layout of the second location.

* * * * *